(12) United States Patent
Imaizumi et al.

(10) Patent No.: US 8,516,371 B2
(45) Date of Patent: Aug. 20, 2013

(54) GUIDANCE INFORMATION PROVIDING DEVICE AND GUIDANCE INFORMATION PROVIDING SYSTEM

(75) Inventors: Shoji Imaizumi, Shinshiro (JP); Hiroshi Sugiura, Toyokawa (JP); Yoichi Kurumasa, Toyokawa (JP); Kaoru Fukuoka, Toyokawa (JP); Yusaku Tanaka, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 170 days.

(21) Appl. No.: 12/795,723

(22) Filed: Jun. 8, 2010

(65) Prior Publication Data

US 2010/0325541 A1 Dec. 23, 2010

(30) Foreign Application Priority Data

Jun. 19, 2009 (JP) .................................. 2009-146477

(51) Int. Cl.
*G06F 3/00* (2006.01)
*G06F 3/048* (2006.01)

(52) U.S. Cl.
USPC ........................... 715/708; 715/781; 715/811

(58) Field of Classification Search
USPC .......................................... 715/708, 781, 811
See application file for complete search history.

(56) References Cited

U.S. PATENT DOCUMENTS 5,500,802 A * 3/1996 Morris et al. ................. 700/182
5,877,966 A * 3/1999 Morris et al. ................. 716/136
7,865,837 B1 * 1/2011 Huff et al. ..................... 715/781
2002/0194267 A1 * 12/2002 Flesner et al. ................ 709/203
2007/0236730 A1 10/2007 Takeuchi et al.

FOREIGN PATENT DOCUMENTS

| JP | 2004-062828 A | 2/2004 |
| JP | 2007-279974 A | 10/2007 |
| JP | 2008-257472 A | 10/2008 |

OTHER PUBLICATIONS

Japanese Decision to Grant a Patent dated May 10, 2011 issued in the corresponding Japanese Patent Application No. 2009-146477 and English language translation.

* cited by examiner

*Primary Examiner* — David Phantana Angkool
(74) *Attorney, Agent, or Firm* — Buchanan Ingersoll & Rooney PC

(57) ABSTRACT

An MFP sequentially displays a plurality of operation screens on a display panel by switching, and receives a user operation on each operation screen. The user operation is performed for the switching or execution of a function, and the operation screens include screens customized by a user. A guidance information providing device includes: an information storage part storing switching information pieces in correspondence with the customized screens; a route generator that generates route information with reference to the stored switching information pieces, the generated route information indicating a display order of customized screens to be sequentially displayed between a current customized screen and a desired customized screen; a controller that selects, from among the stored switching information pieces, a switching information piece indicating switching from the current customized screen to a next customized screen to be displayed according to the display order indicated by the generated route information; a guidance generator that generates guidance information indicating an operation method for the user to switch the current customized screen to the next customized screen; and a communicator that outputs the generated guidance information.

15 Claims, 29 Drawing Sheets

FIG. 7

Operation screen A (standard) 601

| Job | | | | |
|---|---|---|---|---|
| Settings | Shared | Personal | System | Group |
| | Mrs. Tanaka | Mr. Suzuki | Mr. Yamada | |
| | | | | OK |

[Mrs. Tanaka]: "Mrs. Tanaka" in selected state>OK becomes selectable
[Mr. Suzuki ]: "Mr. Suzuki" in selected state>OK becomes selectable
[Mr. Yamada ]: "Mr. Yamada" in selected state>OK becomes selectable

[OK]: to operation screen B

FIG. 8

Operation screen B (standard) 602

| Mr. Suzuki | | | | |
|---|---|---|---|---|
| | Save location | Box Suzuki | | |
| | File name | | | |
| | Scan settings | Original settings | Cancel | Scan |

[ Save location ]: to operation screen A
[ File name   ]: to operation screen for operation of inputting file name
[ Scan settings ]: to operation screen C
[ Original settings ]: to operation screen for operation of original settings
[   Cancel    ]: to operation screen A
[    Scan     ]: start to scan with current settings

FIG. 9

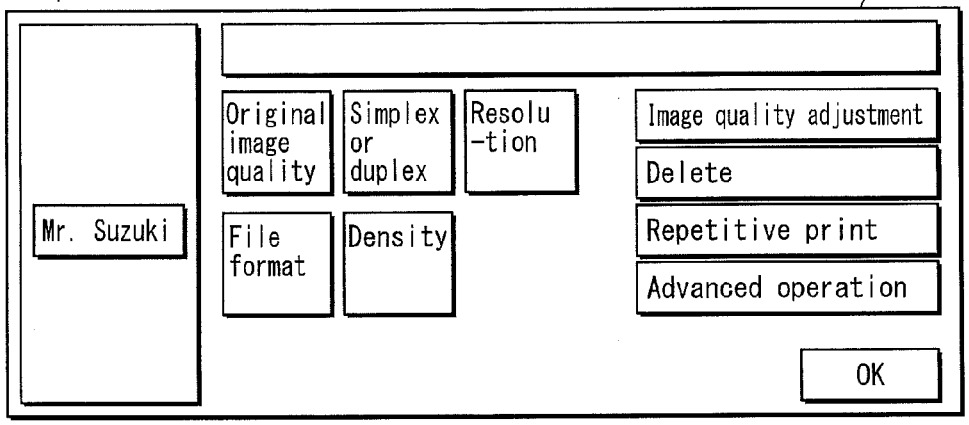

[Original image quality]: to operation screen for operation of original image quality settings
[ Simplex or duplex ]: to operation screen D
[    Resolution    ]: to operation screen for operation of resolution settings
[    File format   ]: to operation screen G
[      Density     ]: to operation screen E
[        OK        ]: to operation screen B
[Image quality adjustment]: to oepration screen F
[      Delete      ]: to operation screen for operation of deleting
[ Repetitive print ]: to operation screen for operation of repetitive print
[ Advanced operation ]: to operation screen for advanced operation

FIG. 10

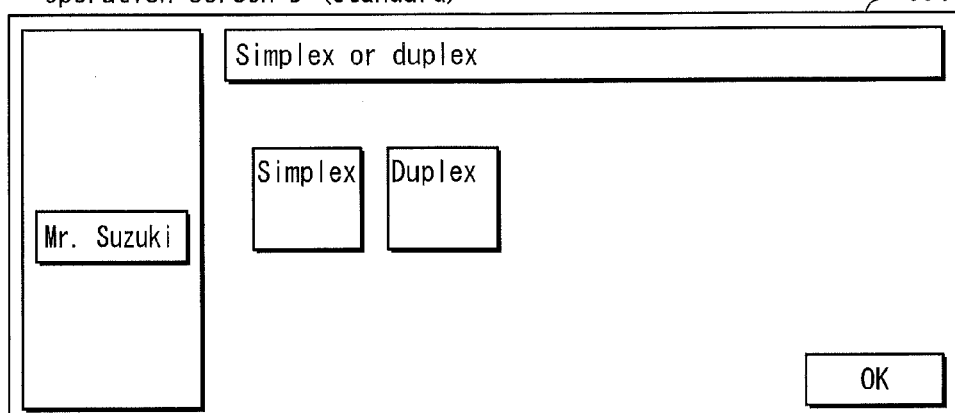

[Simplex]: Simplex in selected state
[ Duplex ]: Duplex in selected state
[   OK  ]: to operation screen C

FIG. 14

Operation screen A' (customized) 611

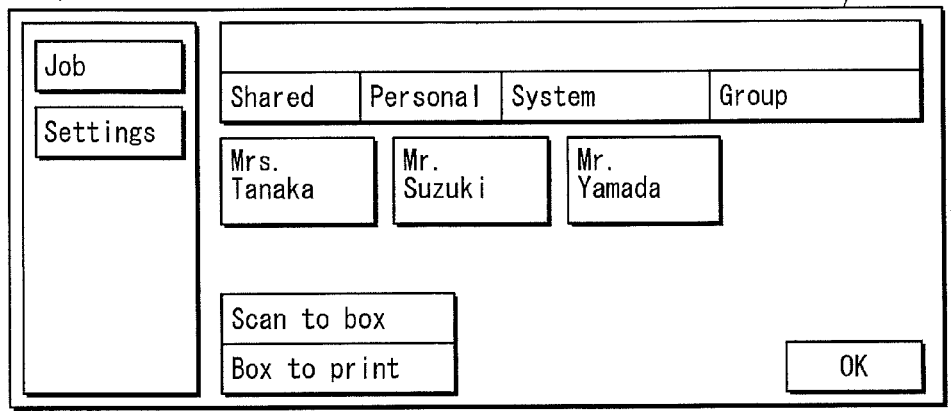

[Mrs. Tanaka]:"Mrs. Tanaka" in selected state>"Scan to box" and "Box to print" become selectable
[Mr. Suzuki ]:"Mr. Suzuki" in selected state>"Scan to box" and "Box to print" become selectable
[Mr. Yamada ]:"Mr. Yamada" in selected state>"Scan to box" and "Box to print" become selectable
[Scan to box]:to operation screen D'
[Box to print]:to operation screen for operation of printing box

FIG. 15

Operation screen B' (customized) 612

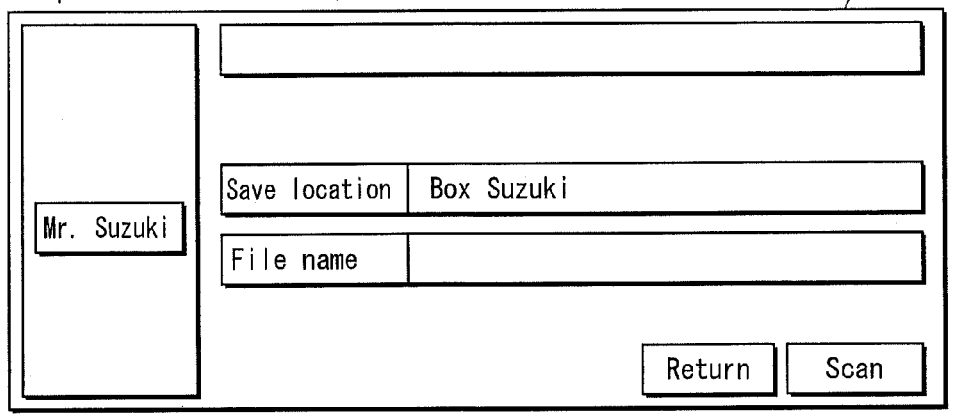

[Save location]: unselectable (just for confirmation)
[ File name ]: to operation screen for operation of inputting file name

[ Return ]: to operation screen G'
[ Scan ]: Start to scan with current settings

FIG. 18

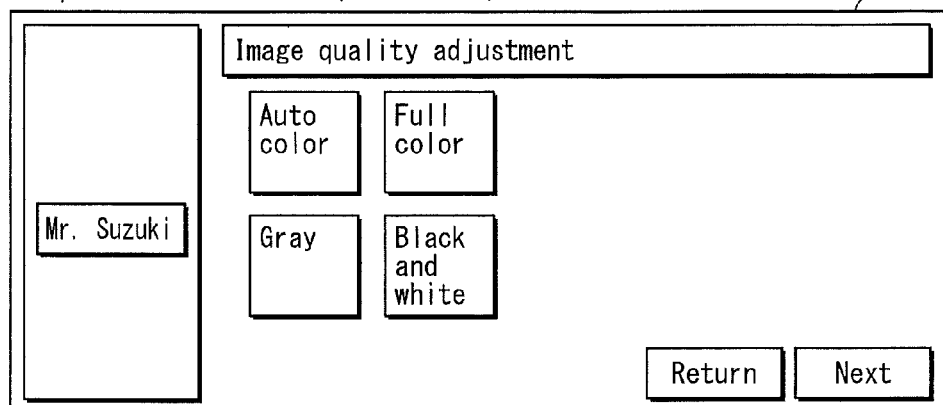

[ Auto color    ]: auto color in selected state
[ Full color    ]: full color in selected state
[    Gray       ]: gray in selected state
[Black and white]: black and white in selected state
[   Return      ]: to operation screen E'
[    Next       ]: to operation screen G'

FIG. 19

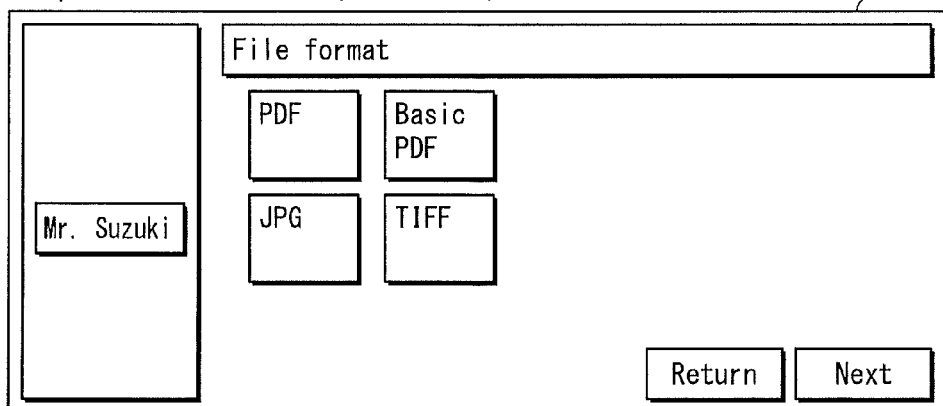

[   PDF      ]: PDF in selected state
[ Basic PDF  ]: basic PDF in selected state
[   JPG      ]: JPG in selected state
[   TIFF     ]: TIFF in selected state
[  Return    ]: to operation screen F'
[   Next     ]: to operation screen B'

FIG. 22

Standard switching table

| Screen | Screen ID | OK | Cancel | Save location | File name | Scan settings | Original settings | Scan |
|---|---|---|---|---|---|---|---|---|
| A | 010 | B | - | - | - | - | - | O |
| B | 011 | - | A | A | ▲ | C | ▲ | - |
| C | 012 | B | - | - | - | - | - | - |
| D | 013 | C | - | - | - | - | - | - |
| E | 014 | C | - | - | - | - | - | - |
| F | 015 | C | - | - | - | - | - | - |
| G | 016 | C | - | - | - | - | - | - |

| | Simplex or duplex | Resolution | File format | Density | Image quality adjustment | Delete | Repetitive print | Advanced operation |
|---|---|---|---|---|---|---|---|---|
| Original image quality | ▲ | ▲ | G | E | F | ▲ | ▲ | ▲ |

▲ : To another screen    O : Execute scan 232a, 232b, 232c, 232d, 232e, 232f, 232g, 232h

FIG. 23

| Command information | | |
|---|---|---|
| Command | Parameter executed by the command | |
| Switch screen | Swith desitination screen ID | |
| Execute scan | — | |

401

GUIDANCE INFORMATION PROVIDING DEVICE AND GUIDANCE INFORMATION PROVIDING SYSTEM

This application is based on application No. 2009-146477 filed in Japan, the contents of which are hereby incorporated by reference.

BACKGROUND OF THE INVENTION (1) Field of the Invention

The present invention relates to a technology for providing guidance information indicating operation methods of the multifunction peripheral to a multifunction peripheral.

(2) Description of the Related Art

Multifunction peripherals (hereinafter referred to as MFPs) have become popular which have the functions of multiple devices, such as a printer, a copier, a FAX, and a scanner. Due to expansion and improvement of the functions, and diversification of user interfaces of MFPs which conversely reduce the operability of the MFP, users unaccustomed to handling an MFP may find difficulty in performing an operation. To address the problem, Patent Document 1 discloses a function which enables users to customize operation screens so that the users can use the functions of an MFP more easily.

Patent Document 1: Japanese Patent Application Publication No. 2004-62828

SUMMARY OF THE INVENTION

Problems to be Solved by the Invention

However, even with the customized function to make it easier for a user to use an operation screen, there still is a restriction in terms of the number of buttons the user can display on the operation screen freely. This is because that the operation panel of the MFP has a smaller size as compared with the display screen of a PC, for example. Accordingly, if the user is unaccustomed to handling the MFP, the above-described customized function alone does not always allow the user to easily make good use of the functions of the MFP. As a result, the user may unexpectedly spend a lot of time and efforts in order to reach an operation screen including the desired function, or even find it difficult to reach the operation screen.

In order to solve the problems, the present invention aims to provide a guidance providing device, a guidance providing system, and a recording medium that stores a computer program for providing guidance on operation methods for the image forming device, all of which provide guidance on operation methods for an image forming device, so that even a user unaccustomed to handling the image forming device is enabled to easily reach a customized screen including the desired function.

Means for Solving the Problems

In order to achieve the above-described object, an aspect of the present invention provides a guidance information providing system comprising an image forming device and a guidance information providing device, wherein the image forming device (i) has a plurality of functions, (ii) sequentially displays a plurality of operation screens on a display panel by switching, and (iii) receives a user operation on each of the operation screens, the user operation being performed for one of the switching and execution of a function, and the operation screens including screens customized by a user of the image forming device, and the guidance information providing device includes: a storage storing a plurality of switching information pieces in correspondence with the customized screens, each switching information piece indicating switching from a corresponding customized screen to another customized screen to be displayed in response to a user operation received on the corresponding screen; a communicator operable to obtain a user specification of a desired customized screen on which a user operation is received for execution of a function desired by the user in the functions and output guidance information to the image forming device; a route generator operable to generate route information with reference to the stored switching information pieces, the generated route information indicating a display order of customized screens to be sequentially displayed between a current customized screen on the display panel and the desired customized screen; a controller operable to select, from among the stored switching information pieces, a switching information piece indicating switching from the current customized screen to a next customized screen to be displayed according to the display order indicated by the generated route information; and a guidance generator operable to generate the guidance information with use of the selected switching information piece, the guidance information indicating an operation method for the user to switch the current customized screen to the next customized screen.

BRIEF DESCRIPTION OF THE DRAWINGS

These and other objects, advantageous effects and features of the invention will become apparent from the following description thereof taken in conjunction with the accompanying drawings which illustrate specific embodiments of the invention. In the drawings:

FIG. 4 is a block diagram showing a structure of a main controller 210 of an MFP 200a;

FIG. 7 shows an example of a standard operation screen A;

FIG. 8 shows an example of a standard operation screen B;

FIG. 9 shows an example of a standard operation screen C;

FIG. 10 shows an example of a standard operation screen D;

FIG. 14 shows an example of a customized operation screen A';

FIG. 15 shows an example of a customized operation screen B';

FIG. 18 shows an example of a customized operation screen F';

FIG. 19 shows an example of a customized operation screen G';

FIG. 22 shows a data structure of a standard switching table 232;

FIG. 23 shows examples of command information;

FIG. 34 is a flowchart showing the operations of the guidance processor 107 to transmit the simplified guidance to the MFP 200a;

FIG. 35 is a flowchart showing the operations of the guidance processor 107 to transmit the detailed guidance to the MFP 200a.

DESCRIPTION OF PREFERRED EMBODIMENT

Embodiment

The following describes a guidance providing system 10 according to a preferred embodiment of the present invention.

1. Guidance Providing Device 100

Figure 1:
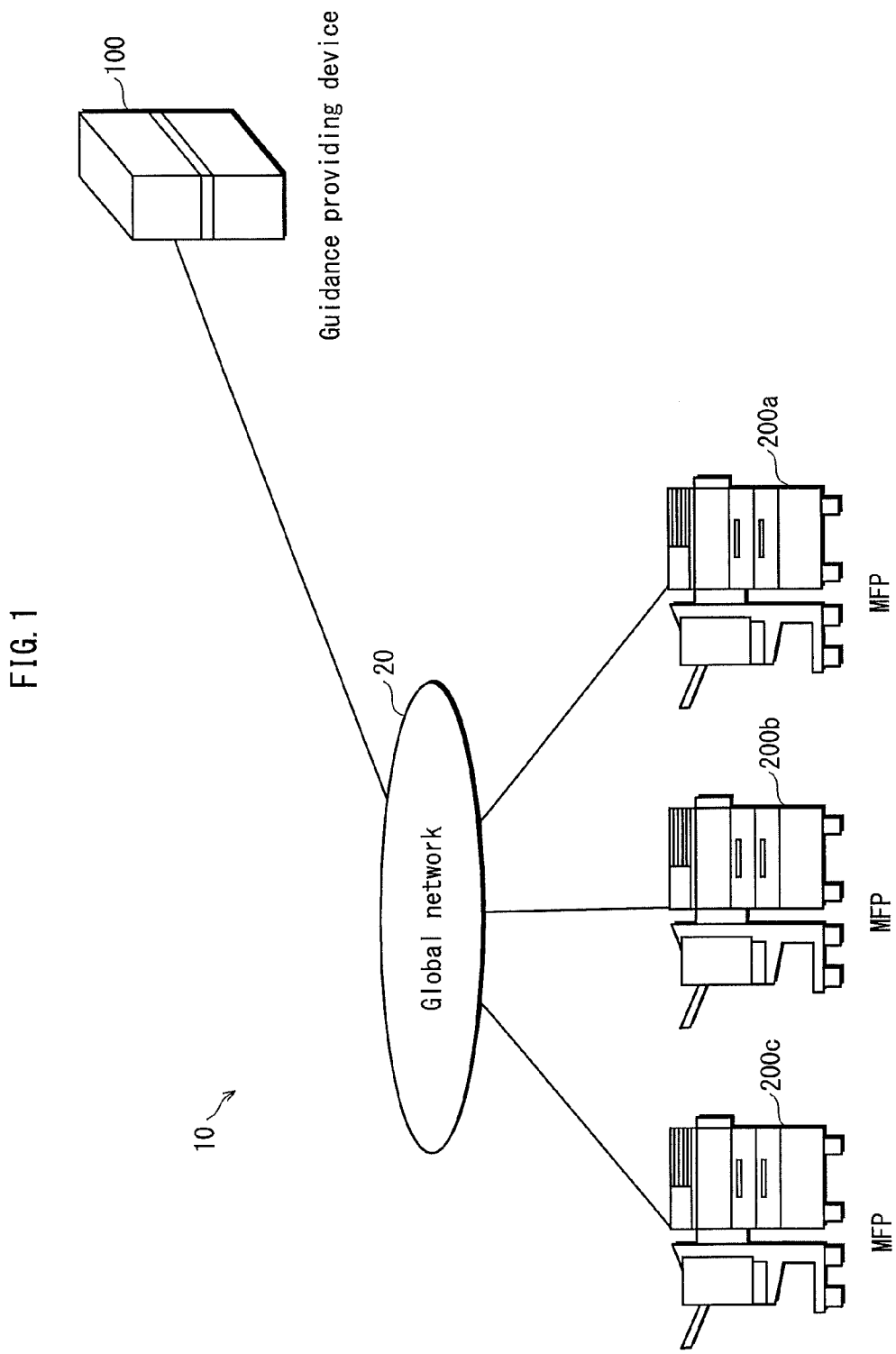
FIG. 1 shows a structure of a guidance providing system 10 according to an embodiment of the present invention.

As shown in FIG. 1, a guidance providing system includes a guidance providing device 100, an MFP 200a, an MFP 200b, and an MFP 200c. The guidance providing device 100 is connected to each of the MFP 200a, the MFP 200b, and the MFP 200c via a global network 20.

The guidance providing device 100 transmits guidance information and the like to each of the MFP 200a, the MFP 200b, and the MFP 200c via the global network 20. In order to provide a user with necessary information for operations or make it easy for the user to operate, each of the MFP 200a, the MFP 200b, and the MFP 200c displays standard operation screens and customized operation screens on its display panel. The standard operation screens is set as a standard, and the customized operation screen is customized for users. In displaying an operation screen, each MFP displays the guidance information transmitted from the guidance providing device 100. According to the displayed guidance information, users operate the MFP 200a, the MFP 200b, and the MFP 200c.

Guidance in this embodiment means to give instructions to the users of the MFPs, and in particular to give introductory instructions to those unaccustomed to the operations.

1.1 Guidance Providing Device 100

Figure 2:
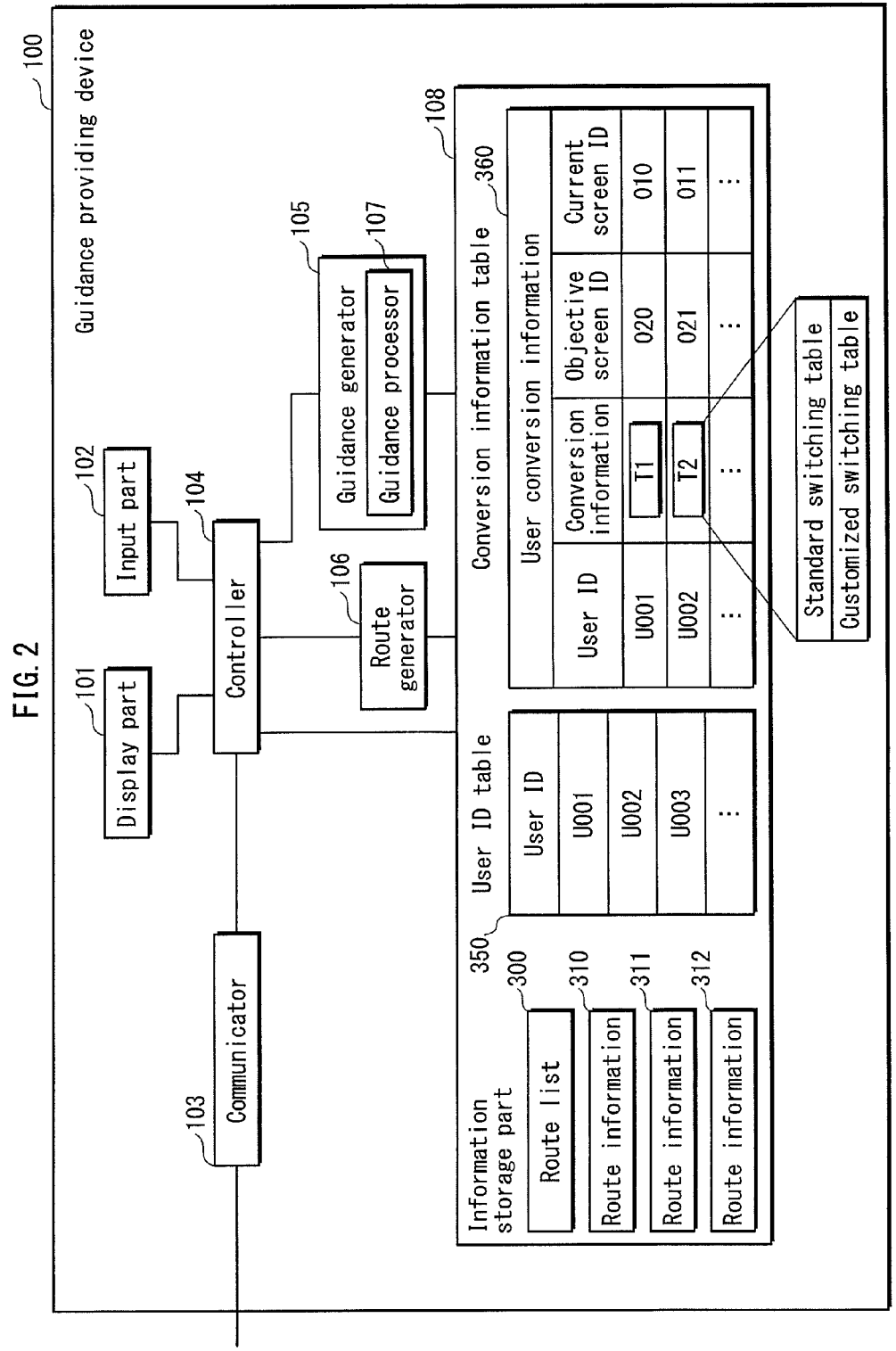
FIG. 2 is a block diagram of a structure of a guidance providing device 100.

As shown in FIG. 2, the guidance providing device 100 includes a display part 101, an input part 102, a communicator 103, a controller 104, a guidance generator 105, a route generator 106, and an information storage part 108. The guidance generator 105 includes a guidance processor 107.

Concretely speaking, the guidance providing device 100 is a computer system that includes a microprocessor, a ROM, a RAM, a hard disk unit, a display unit, a keyboard. The RAM or the hard disk unit stores a computer program. The guidance providing device 100 achieves its function by the microprocessor operating according to the computer program.

(1) Information Storage Part 108

As shown in FIG. 2, the information storage part 108 includes some areas for storing a route list 300, route information 310, 311, and 312, a user ID table 350, a conversion information table 360, and other information.

(User ID Table 350)

The user ID table 350 includes one or more user IDs. The user IDs are identifiers for identifying users of the respective MFPs. The users identified by the user IDs included in the user ID table 350 are those who have been permitted to be provided with guidance information of respective MFPs from the guidance providing device 100.

(Conversion Information Table 360)

The conversion information table 360 includes an area for storing one or more user conversion information pieces. Each user conversion information piece corresponds to a set of customized operation screens that has been registered by the corresponding user. Each user conversion information piece includes a user ID, conversion information, an objective screen ID, and a current screen ID. The user ID is an identifier for identifying the user. The conversion information includes standard and customized switching tables that will be described later. The objective screen ID is an identifier for identifying the operation screen that the user desires to display at the end of the operation. The current screen ID is an identifier for identifying the operation screen currently displayed by an MFP.

The customized switching table included in a conversion information piece in the conversion information table 360 stores a plurality of switching information pieces in correspondence with the customized screens. Each switching information piece indicates switching from a corresponding customized screen to another customized screen to be displayed in response to a user operation received on the corresponding screen. Concretely, each switching information piece includes switch source identification information and switch destination identification information. The switch source identification information identifies a switch source customized screen and the switch destination identification information identifies a switch destination customized screen.

(Route List 300)

Figure 3:
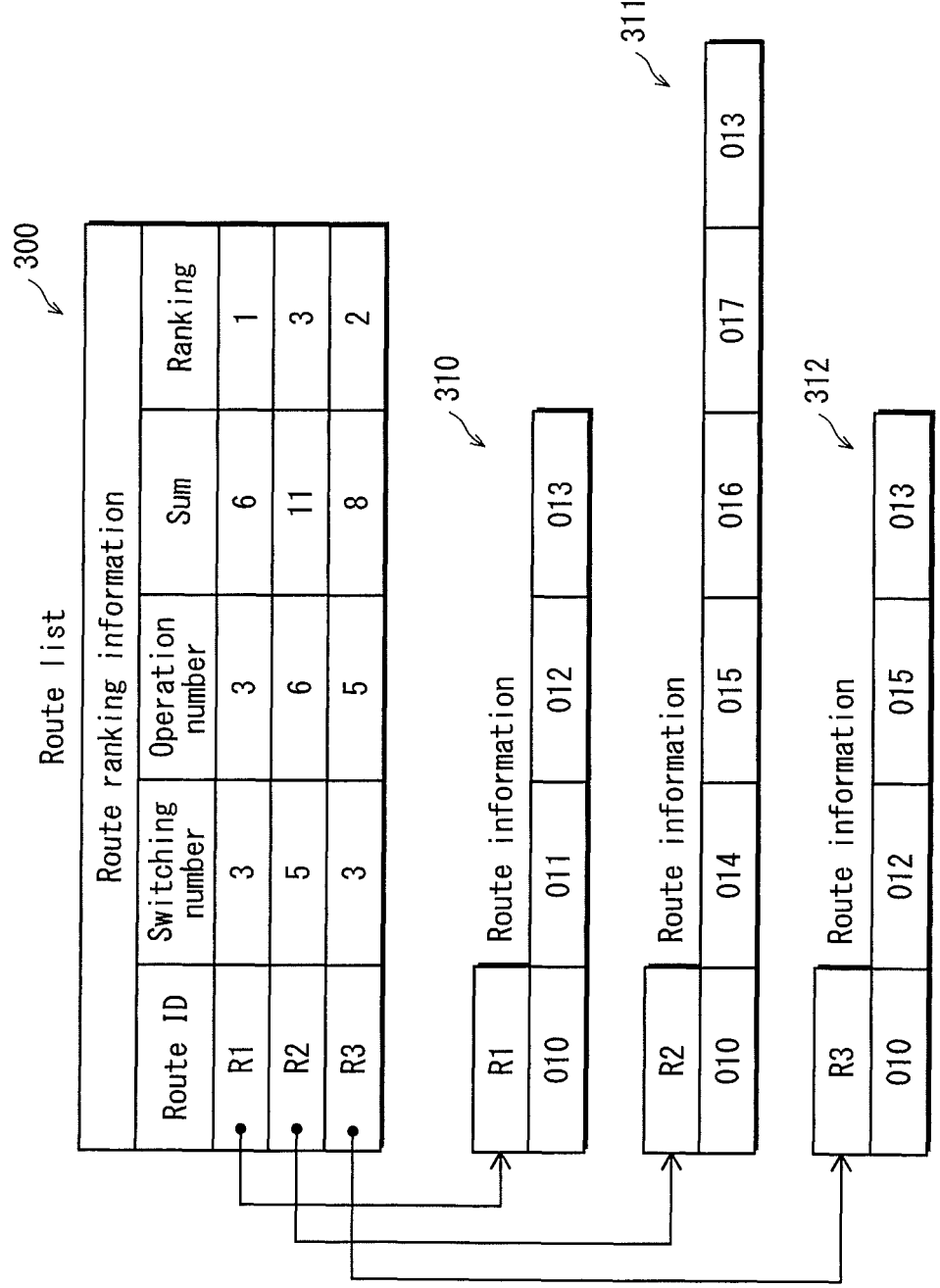
FIG. 3 shows data structures of a route list 300 and route information 310, 311, and 312 included in the guidance providing device 100.

As shown in FIG. 3, the route list includes one or more route ranking information pieces. The route ranking information pieces correspond one-to-one with available routes each composed of the operation screens to be displayed between the current screen and the objective screen in the MFP. Each route ranking information piece includes a route ID, a switching number, an operation number, a sum, and a ranking.

The route ID is an identifier for identifying route information that will be described later.

The switching number shows the number of operation screens to be displayed through switching on the way from the starting to ending points of the route. In other words, the switching number shows how many times the display is switched between the current operation screen and the objective operation screen. For example, a description is given of the state in which the current operation screen is displayed. If the current operation screen is switched to an operation screen Y, then to an operation screen Z, and further to the objective operation screen, the switching number is three.

The operation number shows a total number of operations performed on the displayed operation screens by the user on the way from the starting to ending points of the route. In other words, the operation number shows how many user operations are performed between the current operation screen and the objective operation screen.

The sum shows a sum total of the switching number and the operation number.

The ranking is obtained by ordering all the route ranking information pieces included in the route list 300 in order of their sums from the smallest to the greatest. In other words, the route ranking information piece with the smallest sum is ranked highest, whereas the route ranking information piece with the largest sum is ranked lowest.

(Route Information 310, 311, and 312)

The route information 310 includes a plurality of screen IDs. Those screen IDs identify operation screens that are to be displayed in the route from the current operation screen to the objective operation screen. In the embodiment, the screen IDs are arranged in the route information 310 in order from the current to objective operation screens along the route. This is to say, by following all the screen IDs arranged in the route information 310 from the beginning to the end, the current operation screen ID is ultimately reached to the objective operation screen ID.

As described above, the route information 310 indicates the display order of the IDs of all the operation screens to be displayed between the current operation screen and the objective operation screen. As mentioned above, the current operation screen is a screen currently displayed on the operation panel, and the objective operation screen is a screen on which the user operates to achieve the desired function.

As shown in FIG. 3, the route information 310 includes screen IDs "010", "011", "12", and "013" in the stated order. In other words, the route information 310 indicates the followings. The current operation screen is the screen identified with the screen ID "010", the operation screen containing the desired function of the user is the screen identified with the screen ID "013". Further, the operation screens identified with the screen IDs "011" and "012" are displayed in the stated order on the way along the route.

(2) Display Part 101, Input Part 102, Communicator 103, Controller 104, Guidance Generator 105, Route Generator 106, and Guidance Processor 107

The input part 102 receives an input operation from the operator of the guidance providing device 100 and outputs operation information indicative of the received input operation to the controller 104 as operation information.

The display part 101 displays various kinds of information under control of the controller 104.

The communicator 103 transmits and receives information to and from each of the MFP 200a, the MFP 200b, and the MFP 200c via the global network 20. The communicator 103 obtains a user specification of a desired customized screen on which a user operation is received for execution of a function desired by the user in the functions. The communicator 103 also outputs guidance information that will be described later to the image forming device.

The route generator 106 generates the route information with use of the switching information pieces in one of standard and customized switching tables that will be described later. The route information indicates a display order of operation screens to be sequentially displayed between the current operation screen on the display panel and the operation screen containing the function that the user desires to execute. In the case of the customized screens, the route generator 106 generates the following route information with use of the switching information pieces. The route information in this case indicates a display order of customized screens to be sequentially displayed between the current operation screen on the display panel and the desired customized screen. The route information is generated as follows. The route generator first generates information indicating an order from the desired customized screen to the current customized screen, by tracking back from a switch destination customized screen to a switch source customized screen on a screen-to-screen basis, starting from the desired customized screen. Then, the route generator reverses the generated order to newly generate the route information indicating the display order of customized screens to be sequentially displayed between the current customized screen and the desired customized screen. In this way, the route generator 106 generates the route information based on the desired customized screen.

This can be put another way. As mentioned above, each switching information piece includes the switch source identification information identifying a switch source customized screen and the switch destination identification information identifying a switch destination screen. The route generator obtains objective identification information identifying the desired customized screen, selects a switching information piece containing identical switch destination identification information to the objective identification information from among the stored switching information pieces, extracts switch source identification information from the selected switching information piece, and incorporates the extracted switch source identification information and the obtained objective identification information into the route information. The above operations of the route generator are repeated on a screen-to-screen basis from the desired customized screen to the current customized screen. By reversing thus generated order, the route generator ultimately generates the route information.

The controller 104 controls the display part 101, the input part 102, the communicator 103, the guidance generator 105, the route generator 106, and the guidance processor 107. The controller 104 also selects, from the standard or customized switching table, a specific operation display information piece indicating switching from the current operation screen to the next operation screen according to the display order indicated by the route information. In the case of the customized screens, the controller 104 selects, from among the stored switching information pieces, a switching information piece indicating switching from the current customized screen to a next customized screen to be displayed according to the display order indicated by the generated route information.

Referring to the selected operation display information, the guidance generator 105 generates guidance information indicating an operation method for the user to switch the current operation screen to the next operation screen. In the case of the customized screens, the guidance generator 105 generates the guidance information with use of the selected switching information piece. The guidance information in this case indicates switching from the current customized screen to a next customized screen to be displayed. In other words, the guidance generator generates the guidance information used for guiding the user to perform an operation on the operation display image indicated by the operation display information piece included in the selected switching information piece.

The guidance processor 107 determines between simplified and detailed guidance and transmits the generated simplified and detailed guidance. The guidance processor 107 also generates simplified and detailed guidance.

1.2 MPF 200a, MPF 200b, and MPF 200c

The MFP 200a is a multifunction peripheral in which the functions of multiple devices, such as a printer, a scanner, a copier, and a FAX, are incorporated in one. More specifically, the MFP 200a is a multifunctional image forming device that includes a main controller 210. Meanwhile, since the MFP 200b and the MFP 200c have the identical structure to the MFP 200a, a description is omitted here.

The MFP 200a, namely an image forming device, has a plurality of functions as mentioned above. The MFP 200a also sequentially displays a plurality of operation screens on a display panel by switching and receives a user operation on each of the operation screens. The user operation is performed for one of the switching and execution of a function. The operation screens include screens customized by a user of the MFP 200a.

Figure 4:
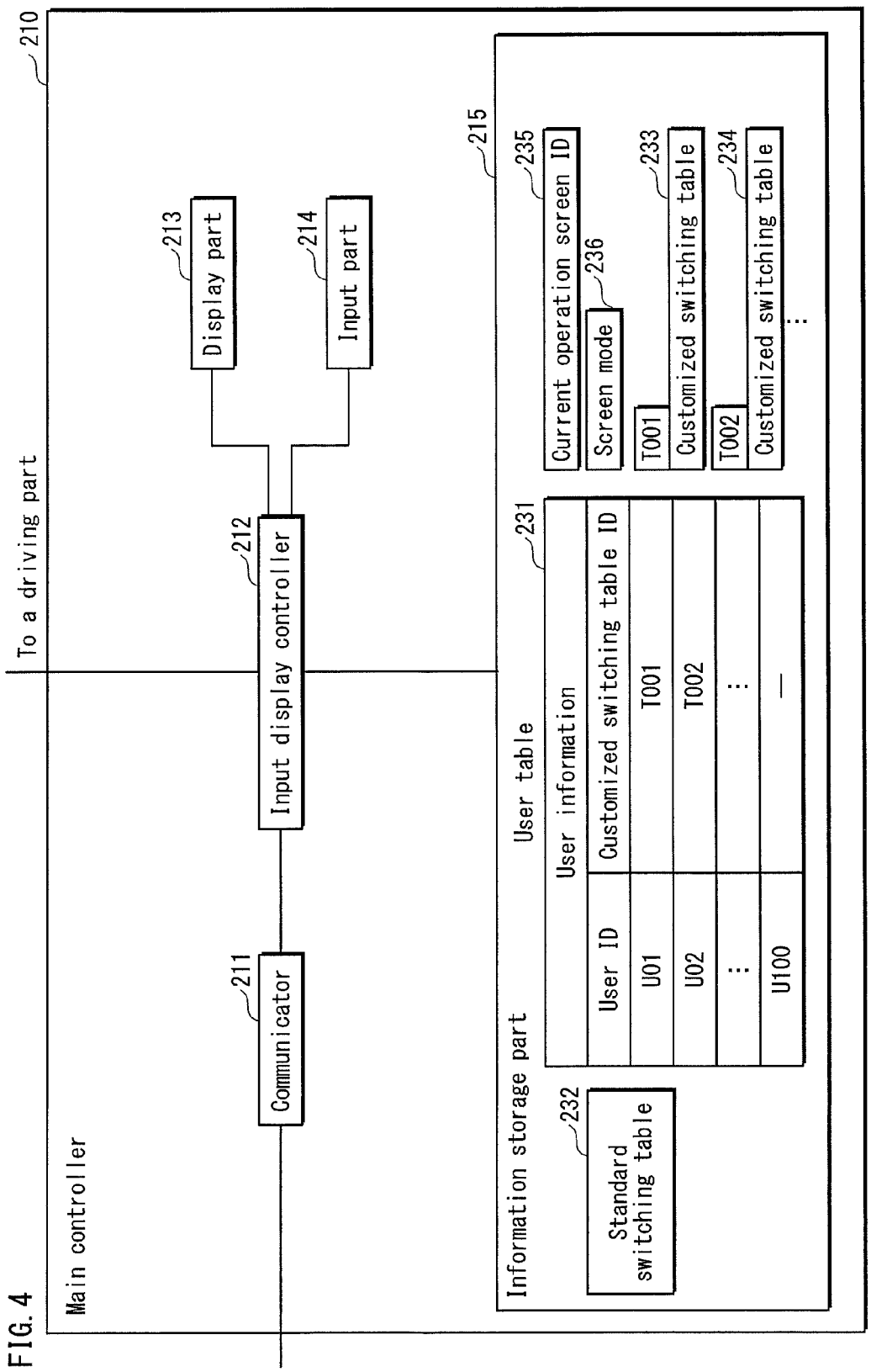

As shown in FIG. 4, the main controller 210 includes a communicator 211, an input display controller 212, a display part 213, an input part 214, and an information storage part 215. Specifically, the main controller 210 is a computer system that includes a microprocessor, a ROM, a RAM, a display unit, and a communication unit. The RAM stores a computer program. The main controller 210 achieves its function by the microprocessor operating according to the computer program.

(1) Communicator 211, Input Display Controller 212, Display Part 213, and Input Part 214

The communicator 211 transmits and receives information to and from the guidance providing device 100 via the global network 20.

The input part 214 receives an input operation from the user of the MFP 200a performed on the display panel, and outputs the received input operations to the input display controller 212 as operation information.

The display part 213 displays, on the display panel, operation screens through which the MFP 200a receives various operations.

The input display controller 212 controls the display of operation screens by the display part 213. The input display controller 212 also controls the communicator 211, the input part 214, and the information storage part 215.

Now, a description is given below of various operation screens displayed by the display part 213.

(Standard and Customized Screens)

The display part 213 sequentially displays operation screens through switching under the control of the input display controller 212. The user switches the display from an operation screen to another operation screen, and to yet another operation screen. By repeating such a switching operation at least once, the user causes the MFP 200a to display the objective operation screen on which the user enters the desired function, that is, an operation screen desired by the user. On the displayed objective operation screen, the MFP 200a receives a user operation regarding the desired function and activates the desired function of the MFP 200a, such as scan, copy, and faxing.

There are two types of operation screens. One is an operation screen that has been prepared for the MFP 200a by its manufacturer as a standard and is called a standard screen. The other is an operation screen that has been customized by the user of the MFP 200a and is called a customized screen. Simply put, each customized screen has been set specially for the sake of convenience of a specific user.

(Standard and Customized Switching)

There are also two ways of switching the display from an operation screen to another operation screen. One is a switching method that has been prepared for the MFP 200a by its manufacturer and is called standard switching. The other is a switching method that has been customized by the user of the MFP 200a and is called customized switching.

As mentioned above, each customized screen has been set specially for convenience of a specific user. The customized switching has been set specially for the user with respect to each customized screen set specially for the user. This is to make it more convenient for the user to switch an (customized) operation screen to another (customized) operation by making an operation on the screen.

Figure 5:
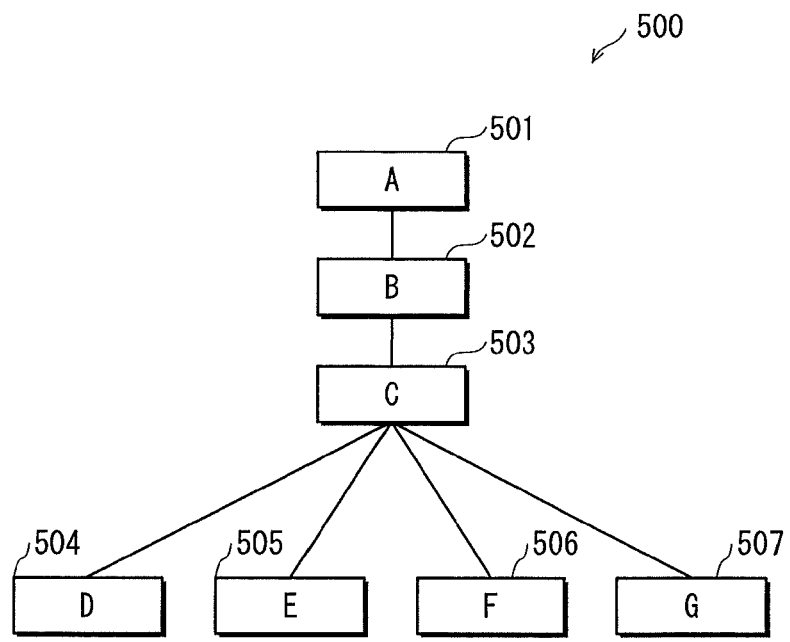
FIG. 5 shows an example of standard switching between standard operation screens.

FIG. 5 shows an example of the standard switching performed on the standard screens. As shown in FIG. 5, seven types of the operation screens 501, 502, 503, 504, 505, 506, and 507 exist as the standard screens displayed on the display part 213 of the MFP 200a. Firstly, a description is made of the state in which the operation screen 501 is displayed. In response to a user operation, the input display controller 212 controls the display part 213 to display the operation screen 502. Such switching of the operation screens as from the operation screen 501 to the operation screen 502 is referred to as the switching of the operation screens. Then, the following relates to the state in which the operation screen 502 is displayed. In response to a user operation, the input display controller 212 controls the display part 213 to display the operation screen 503. Subsequently, the following relates to the state in which the operation screen 503 is displayed. In response to a user operation, the input display controller 212 controls the display part 213 to display one of the operation screens 504, 505, 506, and 507.

Figure 6:
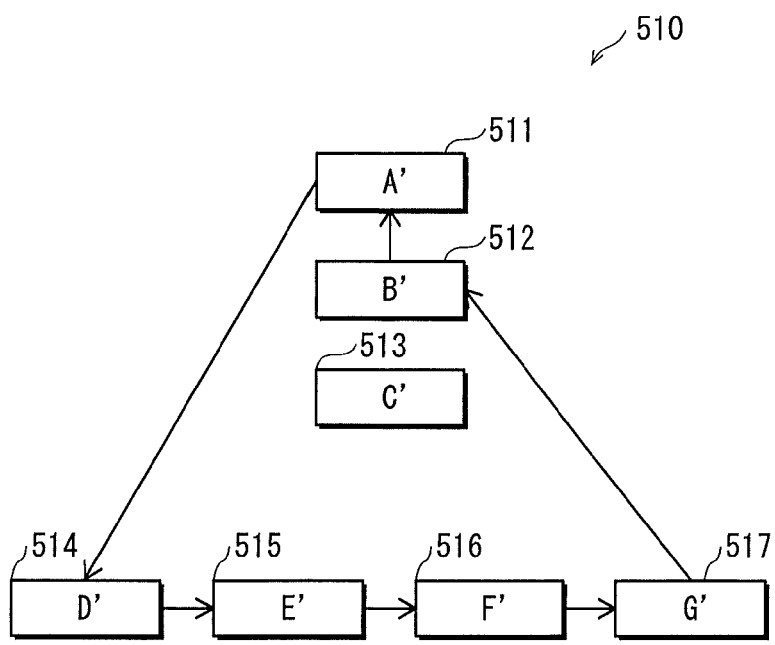
FIG. 6 shows an example of customized switching between customized operation screens.
Figure 11:
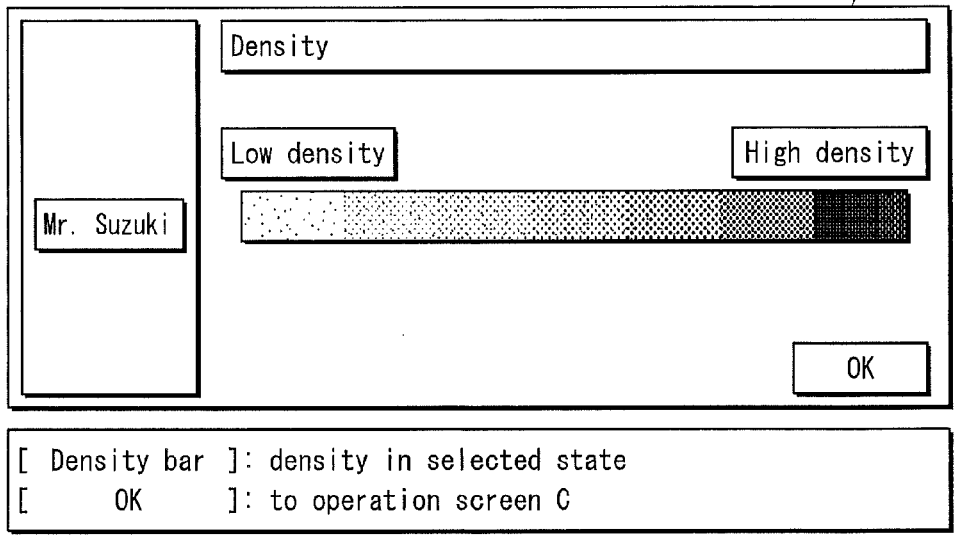
FIG. 11 shows an example of a standard operation screen E.
Figure 12:
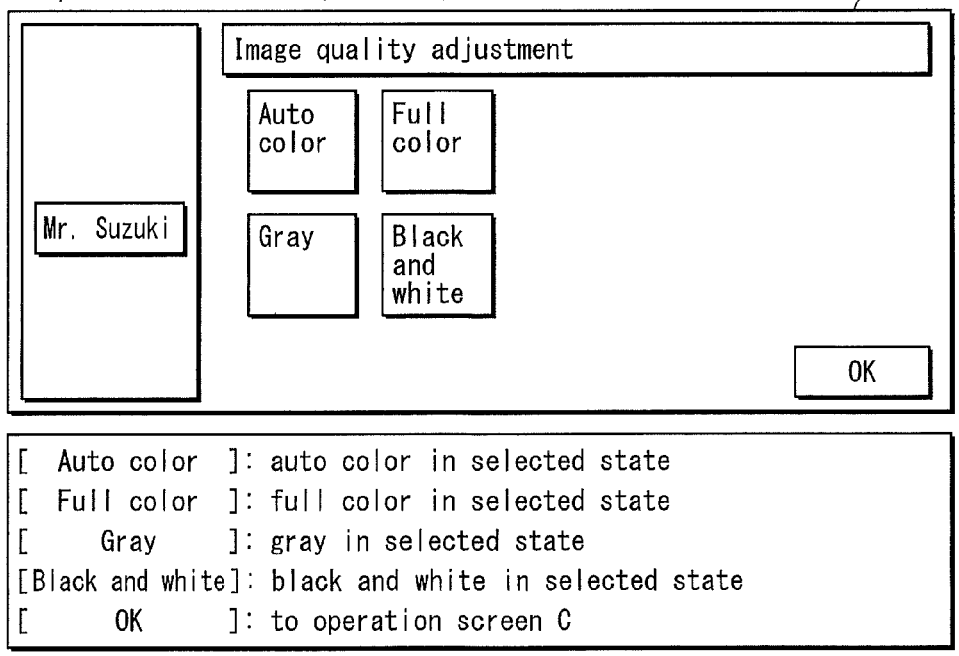
FIG. 12 shows an example of a standard operation screen F.
Figure 13:
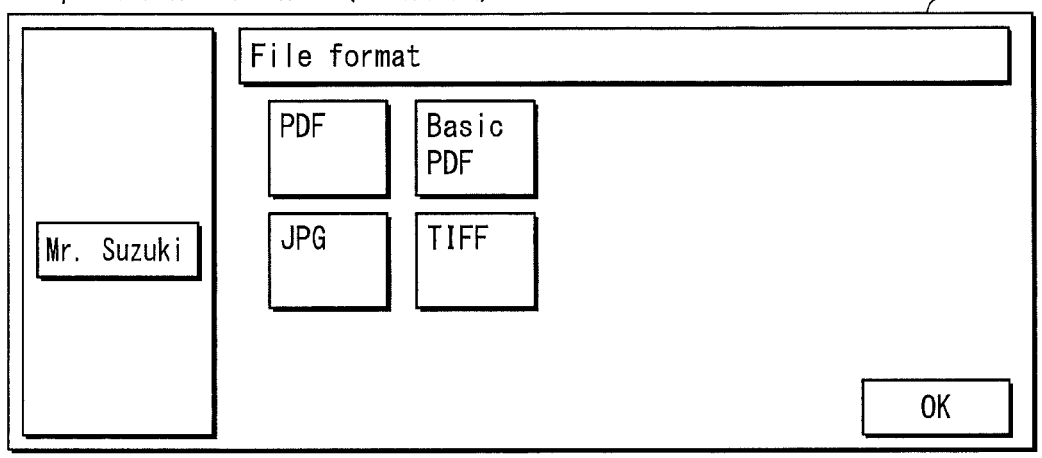
FIG. 13 shows an example of a standard operation screen G.
Figure 16:
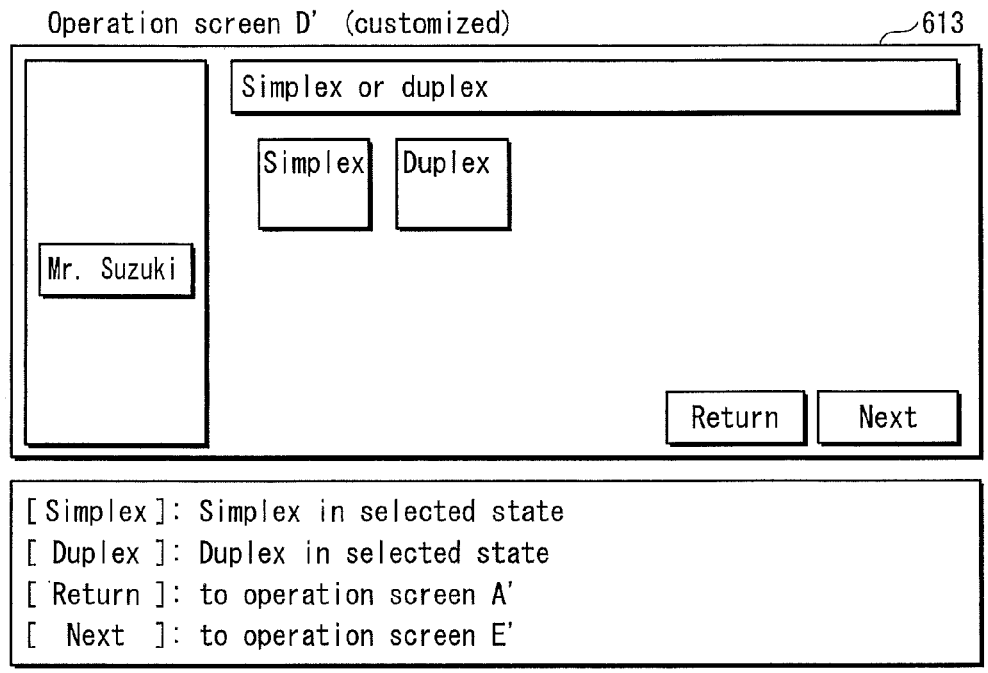
FIG. 16 shows an example of a customized operation screen D'.
Figure 17:
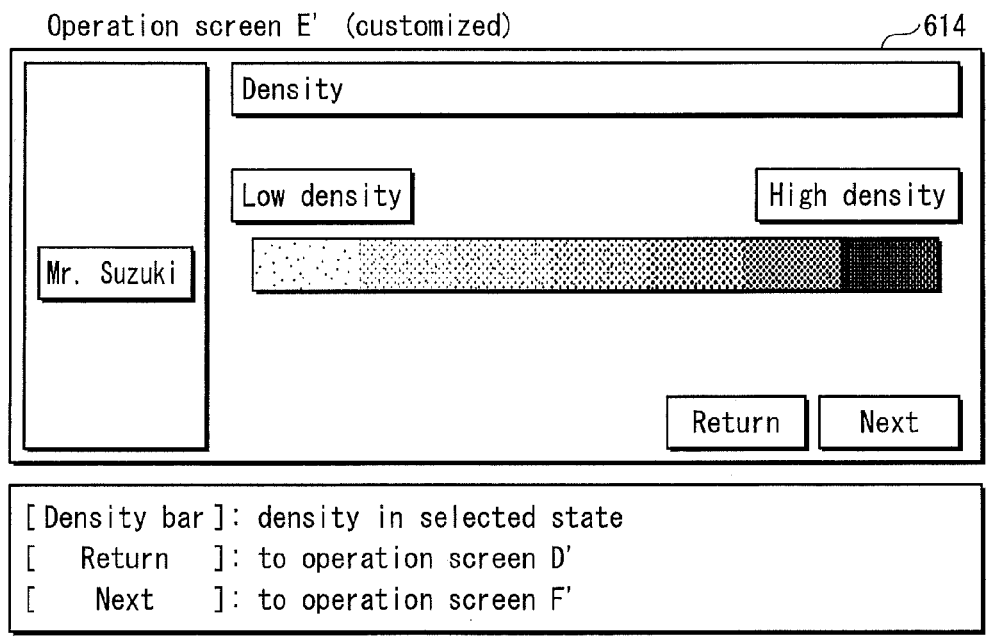
FIG. 17 shows an example of a customized operation screen E'.

Next, FIG. 6 shows an example of the customized switching performed on the customized screens.

As shown in the example in FIG. 6, six types of the operation screens 511, 512, 513, 514, 515, 516, and 517 exist as the customized screens displayed on the display part 213 of the MFP 200a. The standard operation screen 501 corresponds to the customized operation screen 511. Similarly, the standard operation screens 502, 504, 505, 506, and 507 correspond to the customized operation screens 512, 514, 515, 516, and 517, respectively.

Firstly, a description is given of the state in which screen 511 is displayed. In response to a user operation, the input display controller 212 controls the display part 213 to display the operation screen 514. Then, the following relates to the state in which the operation screen 514 is displayed. In response to a user operation, the input display controller 212 controls the display part 213 to display the operation screen 515. Subsequently, in response to user operations, the input display controller 212 controls the display part 213 to display each of the operation screens 516, 517, 512, and 511 in the stated order. Thus, as shown in FIG. 6, the display is switched sequentially in order of the operation screens 511, 514, 515, 516, 517, and 512, and then returned to the operation screen 511. Meanwhile, the operation screen 513 corresponding to the operation screen 503 of FIG. 5 is not used in the customized switching in this example.

(Examples of Standard and Customized Screens)

FIG. 7 to FIG. 13 show the operation screens 601 to 607, respectively as the examples of the standard screens. For example, in the operation screen 601, operation display images of "OK", "Mrs. Tanaka", "Mr. Suzuki", and "Mr. Yamada" are displayed. Each of these operation images (i) indicates the user an operation spot on the display panel and is displayed on the display panel on which a user operation is received and (ii) represents a parameter, namely one of a function and the switching, to be performed in the MFP 200*a* in response to a user operation. In this example, "Mrs. Tanaka", "Mr. Suzuki", and "Mr. Yamada" are user names. Firstly, a description is given of the state in which the operation screen 601 is displayed. In response to a user operation on the operation display image "Mrs. Tanaka", the operation display image "Mrs. Tanaka" is highlighted, indicating that "Mrs. Tanaka" is in a selected state. That "Mrs. Tanaka" is in a selected state means that a box allocated to "Mrs. Tanaka" is in a selected state. In this example, the box is a storing area included inside the MFP 200*a*. This description also applies to the operation display images "Mr. Suzuki" and "Mr. Yamada". As mentioned above, the operation display images "Mrs. Tanaka", "Mr. Suzuki", and "Mr. Yamada" are images on which user operations are made for execution of functions executable in the MFP 200*a*. The operation display image "OK" is an image on which a user operation is made for switching of the operation screens. In response to a user operation on the operation display image "OK" performed in the above state, the operation screen 602 is displayed next. In the operation screen 602, the operation display images "save location", "file name", "scan settings", "cancel", "original settings", and "scan" are displayed. These operation display images "save location", "file name", "scan settings", "cancel", "original settings", and "scan" are exemplary images on which user operations are made for switching to the corresponding operation screens. The operation display image "scan" is an image on which a user operation is made for execution of scan which is one of the functions executable in the MFP 200*a*. In response to a user operation on the "scan settings", the operation screen 603 is displayed next. Similarly, regarding each of the operation screens 603 to 607, in response to a user operation on one of the operation display images displayed on the operation screen, the corresponding processing is executed. The display of each of the operation screens 601 to 607 is switched according to the standard switching of the standard screens as shown in FIG. 5.

FIG. 14 to FIG. 19 show the operation screens 611 to 616, respectively as the examples of the customized screens. In the operation screen 611, operation display images of "Mrs. Tanaka", "Mr. Suzuki", "Mr. Yamada", "scan to box", "box to print", and others. Firstly, a description is given of the state in which the operation screen 611 is displayed. In response to a user operation on the operation display image "scan to box", the operation screen 613 is displayed next. In response to a user operation on the operation display image "next" on the operation screen 613, the operation screen 614 is displayed next. The switching of each of the operation screens 611 to 616 is performed according, to the customized switching of the customized screens as shown in FIG. 6.

In addition, like the above case of the standard operation screens, each operation display image included in a customized screen is one of an image on which a user operation is made for switching to another customized screen and an image on which a user operation is received for execution of a function executable in the MFP 200*a*.

(Examples of Simplified and Detailed Guidance)

Under the control of the input display controller 212, the display part 213 also displays simplified or detailed guidance on each operation screen. The simplified guidance is to present the user guidance as to how to switch the current customized screen currently on the display panel to the next customized screen that is to be displayed next. The detailed guidance is to present the user (i) guidance as to how to deal with the operation display images on the display panel and (ii) a method to switch to the next customized screen to be displayed next. Each operation display image included in the current customized screen represents one of the switching and a function.

Note that the guidance information in this embodiment refers to guidance given by both the simplified and detailed guidance. In other words, the guidance information according to the simplified guidance indicates the operation method for the user to switch the current customized screen to the next customized screen. The guidance information according to the detailed guidance indicates the user (i) an operation method of the operation display images on the display panel and (ii) a method to switch to the next customized screen to be displayed next. Each operation display image included in the current customized screen represents one of the switching and a function.

Next, a description is given below of examples of the simplified and detailed guidance.

Figure 20:
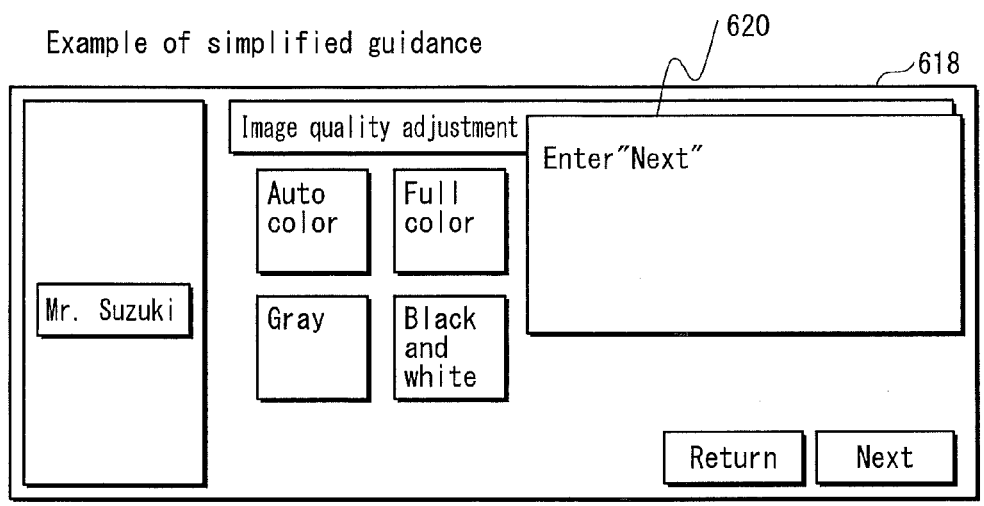
FIG. 20 shows an example of simplified guidance.

FIG. 20 shows an example of the simplified guidance. As can be seen from FIG. 20, the simplified guidance screen 620 is superimposed on the operation screen 618 on the display panel. The simplified guidance screen 620 contains the guidance information "enter 'next'". On the operation screen 618, the user performs an operation on the operation display image "next" in accordance with the guidance information contained in the simplified guidance screen 620.

Figure 21:
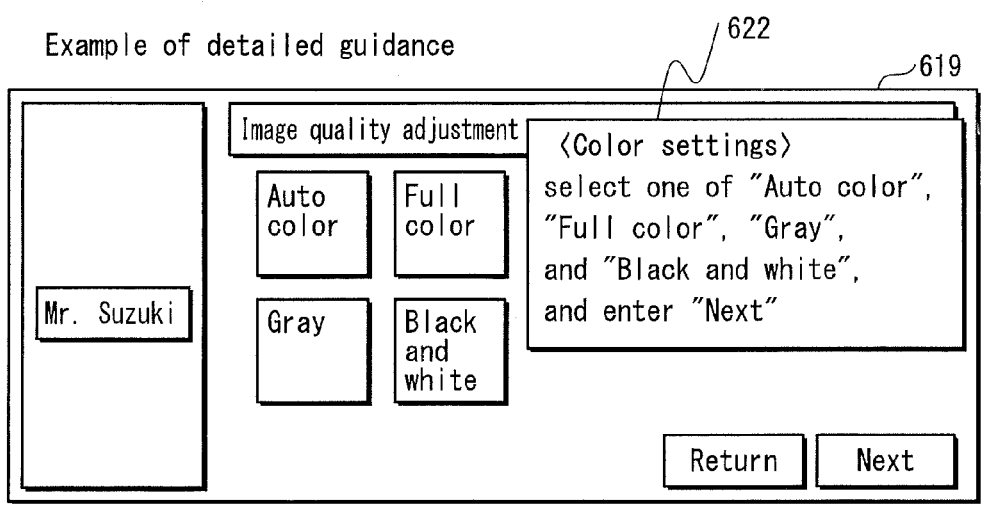
FIG. 21 shows an example of detailed guidance.

FIG. 21 shows an example of the detailed guidance. As can be seen from FIG. 21, the detailed guidance screen 622 is superimposed on the operation screen 619 on the display panel. The detailed guidance screen 622 contains the guidance information of "<color settings> select one of 'auto color', 'full color', 'gray', 'black and white', and enter 'next'". On the operation screen 619, in accordance with the guidance information contained in the detailed guidance screen 622, the user performs an operation on one of the operation display images of "auto color", "full color", "gray", "black and white", and then "next".

(2) Information Storage Part 215

As shown in FIG. 4, the information storage part 215 includes areas for storing a user table 231, a standard switching table 232, customized switching tables 233, 234 . . . , a screen ID of the current operation screen 235, a screen mode 236, and other information.

(User Table 231)

As shown in FIG. 4, the user table 231 includes a plurality of user information pieces, each corresponding to one of users of the MFP 200*a*. Each user information piece includes a user ID and may additionally includes a customized switching table ID. The user ID is an identifier for identifying the corresponding user. The customized switching table ID is an identifier for identifying the corresponding customized switching table. If the user has not registered any customized table in the MFP 200*a*, the user information only includes the user ID. If the user has registered a customized table in the MFP 200*a*, the user information includes both the user ID and the customized switching table ID.

(Standard Switching Table 232)

As shown in an example of FIG. 22, the standard switching table 232 defines the following three items for each of the standard operation screens A to G: one or more operation display images displayed on a corresponding standard operation screen; a switch destination operation screen to be displayed in response to a user operation on each operation display image on the corresponding standard operation screen; and a function of the MFP 200a to be executed in response to a user operation on each operation display image on the corresponding standard operation screen. In other words, the standard switching table 232 includes switching information pieces in correspondence with operation screens on the display panel. Each switching information piece indicates switching from a corresponding operation screen to another operation screen to be displayed in response to a user operation on the operation screen on the display panel.

The standard switching table 232 includes a row for operation display information 232a and a plurality of rows for functional information 232b to 232h. The row for operation display information 232a includes a plurality of operation display information pieces. Each operation display information piece indicates one of the switching and a function to be displayed as a corresponding operation display image. Each row for functional information includes a screen title, a screen ID, and at least one command information piece. Here, the screen title and the screen ID are respectively a title and an identifier of the screen to be switched. Command information pieces included in rows for functional information correspond one-to-one with the operation display information pieces included in the row for operation display information 232a.

As shown in FIG. 23, each command information piece is composed of a command (i.e. an operation code) and a parameter (i.e. an operand) of the command. As one example, the command is "switch screen". In this case, the parameter is "screen ID of the destination screen", for example. As another example, the command is "execute scan". The parameter for the command "execute scan" does not exist.

The screen ID contained in each row for function information and the destination screen ID contained in each command information piece constitute the switching information piece of the screen. Note that the screen ID contained in each row for function information is an identifier of the switch source screen, and the screen ID contained in each command information piece is an identifier of the switch destination screen.

In response to the user operation on any one of the operation display images indicated by the operation display information pieces, the command is executed as indicated by the corresponding command information piece.

As shown in FIG. 22 for example, the row for operation display information 232a contains the operation display information pieces of "OK", "cancel", "save location", "file name", ..., and "advanced operation". Further, the row for function information 232b contains the screen title of "A" and the screen ID of "010", for example. The row for function information 232b also contains the command information pieces of "switch to the screen B", "–", "–", "–", .... Note that in FIG. 22 "switch to the screen B" is represented simply as "B" for simplification. Meanwhile, "–" indicates that the command information piece does not exist.

The standard switching table 232 shows the followings, for example. Firstly, a description is given of the state in which the operation screen A is displayed. In response to a user operation on operation display image "OK" which is displayed on the screen, the operation screen B is displayed. The operation screen B contains the operation display images of "cancel", "save location", "file name", "scan settings", "original settings", and "scan". In response to user operations on the operation display images "cancel", "save location", "file name", "scan settings", and "original settings", the operation screen A, the operation screen A, an operation screen other than B, the operation screen C, and an operation screen other than B are displayed, respectively. Further, in response to a user operation on the operation display image "scan" on the operation screen B, scan is started. The same description applies to the other operation screens as well.

(Customized Switching Tables 233, 234 ...)

Figure 24:
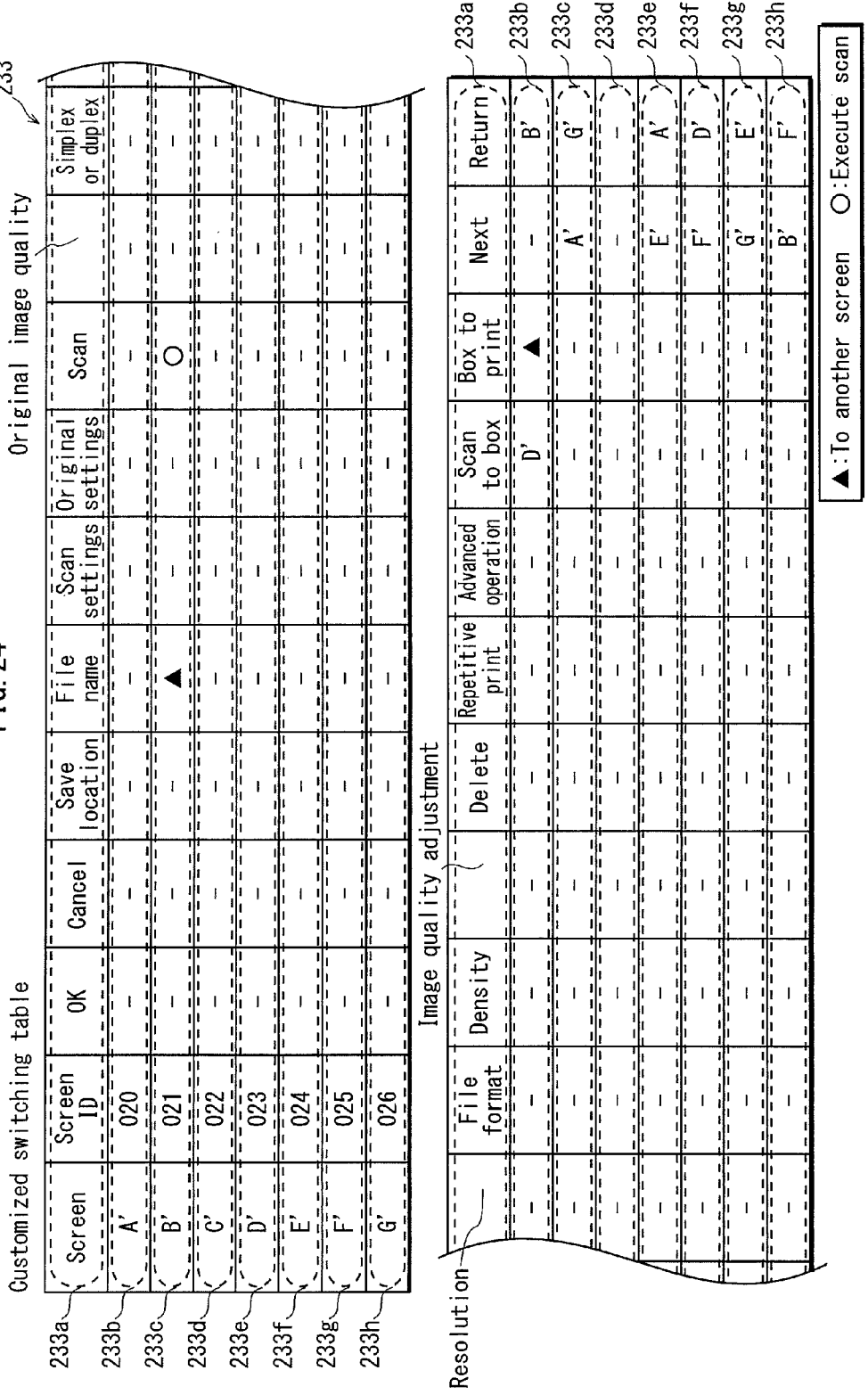
FIG. 24 shows a data structure of a customized switching table 233.

As shown in an example of FIG. 24, the customized switching table 233 defines the following three items for each of the customized operation screens A' to G': one or more operation display image to be displayed on a corresponding screen; a switch destination customized screen to be displayed in response to a user operation on each operation display image on the corresponding customized operation screen; and a function of the MFP 200a to be executed in response to a user operation on each operation display image on the corresponding customized screen. In other words, the standard switching table 233 includes switching information pieces in correspondence with operation screens on the display panel. Each switching information piece indicates switching from a corresponding operation screen to another operation screen to be displayed in response to a user operation on the operation screen on the display panel.

As with the standard switching table 232, the customized switching table 233 also includes a row for operation display information 233a and a plurality of rows for functional information 233b to 233h. The row for operation display information 233a includes a plurality of operation display information pieces. Each operation display information piece indicates one of the switching and a function to be displayed as a corresponding operation display image. Each row for functional information includes a screen title, a screen ID, and at least one command information piece. Here, the screen title and the screen ID are respectively a title and an identifier of the screen to be switched. The command information piece contained in each row for functional information corresponds to one of the operation display information pieces contained in the row for operation display information 233a. The command information piece has been described above.

The screen ID contained in one of rows for function information and the destination screen ID contained in one of command information pieces constitute the switching information piece of the screen. Note that the screen ID contained in each row for function information is an identifier of the switch source screen, and the screen ID contained in each command information piece is an identifier of the switch destination screen.

As shown in FIG. 24 for example, the row for operation display information 233a contains the operation display information pieces of "OK", "cancel", "save location", "file name", ... and "return". Further, the row for function information 233e contains the screen title of "D" and the screen ID of "023", for example. The row for function information 233e also contains the command information pieces of "–", "–", "–", ... "switch to the screen E'", and "switch the display to A'". Note that again in FIG. 24 "switch to the screen E'" is represented simply as "E'" for simplification. Meanwhile, "–" indicates that the command information piece does not exist.

The customized switching table 233 shows the followings, for example. Firstly, a description is given of the state in which the operation screen A' is displayed which contains the operation display images of "scan to box" and "box to print".

In response to a user operation on the operation display image "scan to box", the operation screen D' is displayed. The operation screen D' contains the operation display images of "next" and "return". In response to user operations on the operation display images of "next" and "return", the operation screen E' and the operation screen A' are displayed, respectively. Further, in response to a user operation on the operation display image "scan" on the operation screen B', scan is started. The same description applies to the other operation screens as well.

Since the customized switching tables 234, . . . have the similar structure to the standard switching table 233, a description will be omitted here.

(Screen ID of Current Operation Screen 235)

The screen ID of the current operation screen 235 is an identifier of the screen that is currently displayed on the display part 213 of the MFP 200a.

(Screen Mode 236)

The screen mode 236 indicates whether the MFP 200a is set to display the standard operation screens that have been set as a standard or the customized operation screens that have been customized by each user.

For example, if the screen mode 236 is set to "0", this indicates that the MFP 200a is set to display the standard operation screens. On the other hand, if the screen mode 236 is set to "1", this indicates that the MFP 200a is set to display the customized operation screens.

2. Operations of Guidance Providing System 10

A description is given below of the operations of the guidance providing system 10.

(1) Outline of Display Processing Operations of MFP 200a

Figure 25:
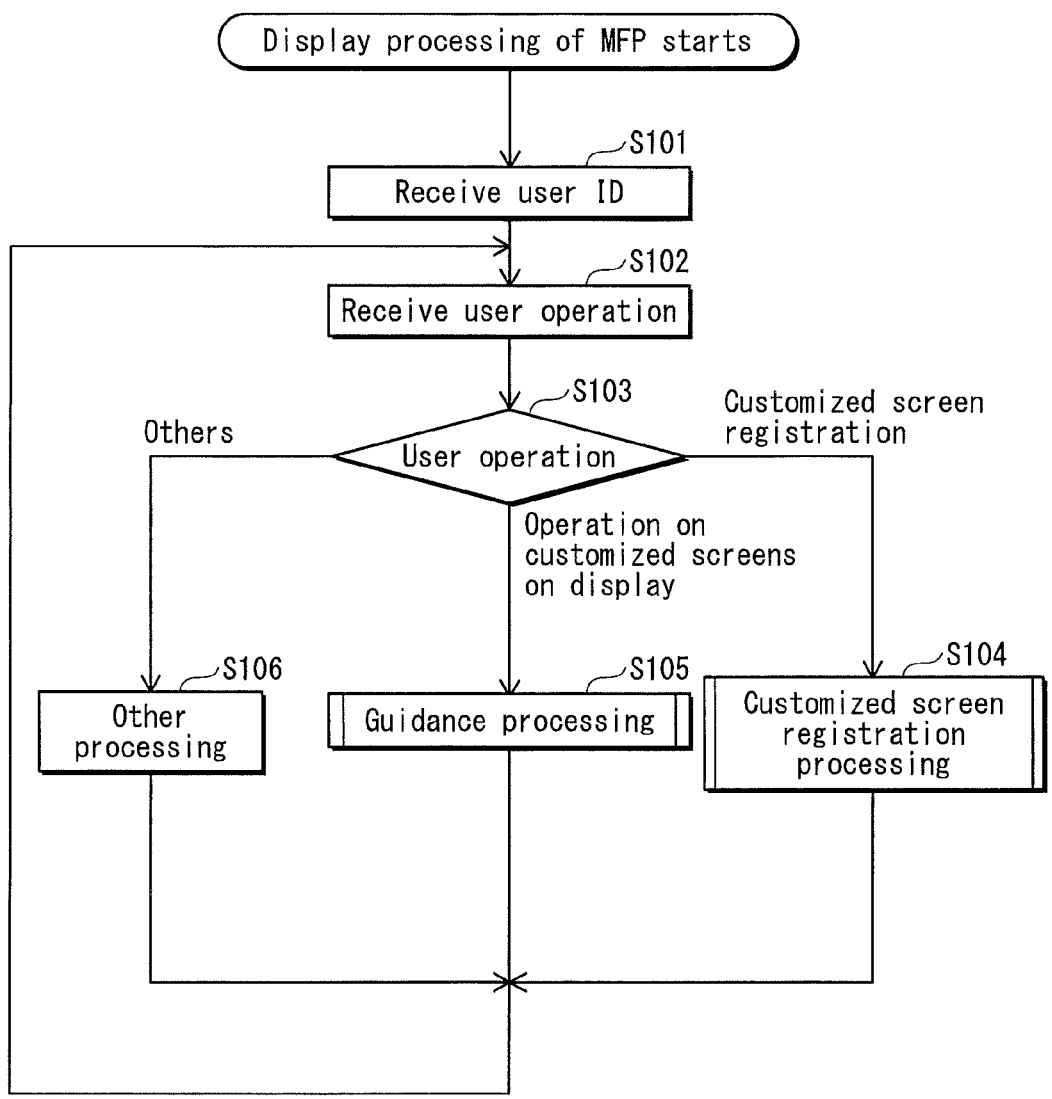
FIG. 25 is a flowchart showing an outline of the operations of the MFP 200a in display processing.

Firstly, a description is given of the outline of display processing operations of the MFP 200a with reference to a flowchart of FIG. 25.

The input display controller 212 receives, via the input part 214, an input from the user indicating the user ID (Step S101), and subsequently a user operation (Step S102). If the received user operation is "register a customized screen", the input display controller 212 proceeds with customized screen register processing (Step S104). If the received user operation is "an operations made on a customized screen", the input display controller 212 proceeds with guidance processing (Step S105). If the received user operation is an operation other than "register a customized screen" and "an operations made on a customized screen", the input display controller 212 proceeds with the corresponding processing (Step S106). Subsequently, the processing returns to Step S102 to repeat the series of processing.

(2) Customized Screen Register Operations of MFP 200a

Figure 26:
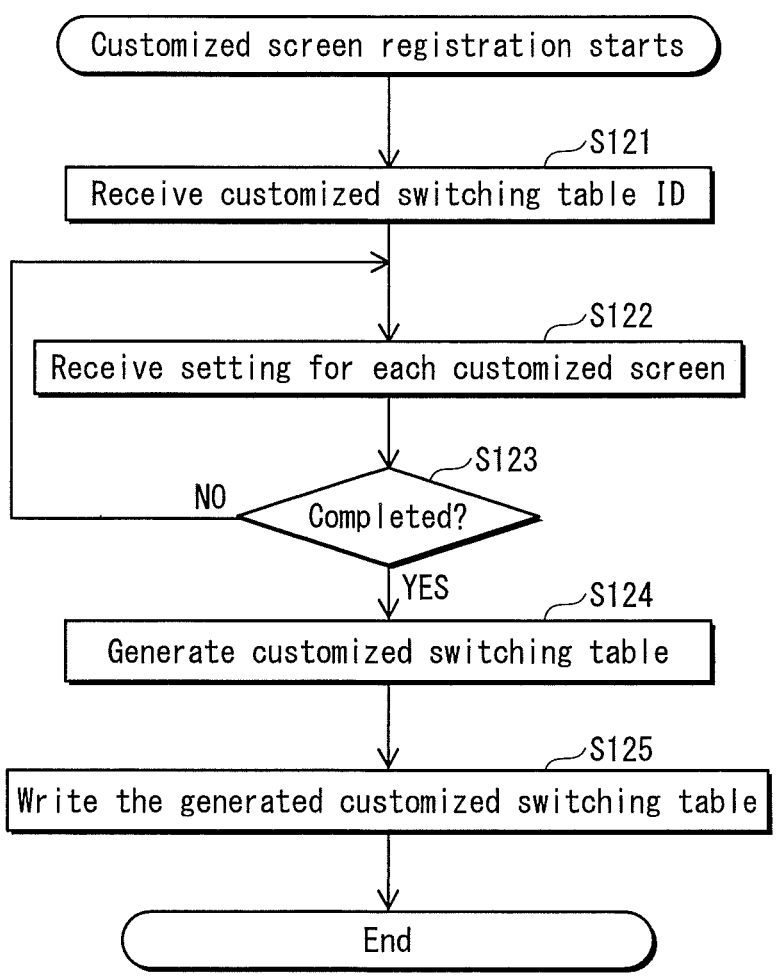
FIG. 26 is a flowchart of the operations of the MFP 200a performed to register customized screens.

A description is given of the customized screen register operations of the MFP 200a with reference to the flowchart of FIG. 26.

The input display controller 212 receives, via the input part 214, an input from the user indicating the customized switching ID (Step S121), and subsequently an input from the user providing a setting for each of the customized screens (Step S122). If the setting for each customized screen has not completed (NO in Step S123), the processing returns to Step S122. If the setting for each customized screen has completed (YES in Step S123), the input display controller 212 generates a customized switching table, using all the customized screens that have been set up (Step S124). The input display controller 212 writes, into the information storage part 215, the generated customized switching table together with the customized switching table ID.

(3) Guidance Processing of Guidance Providing Device 100 and MFP 200a

Figure 27:
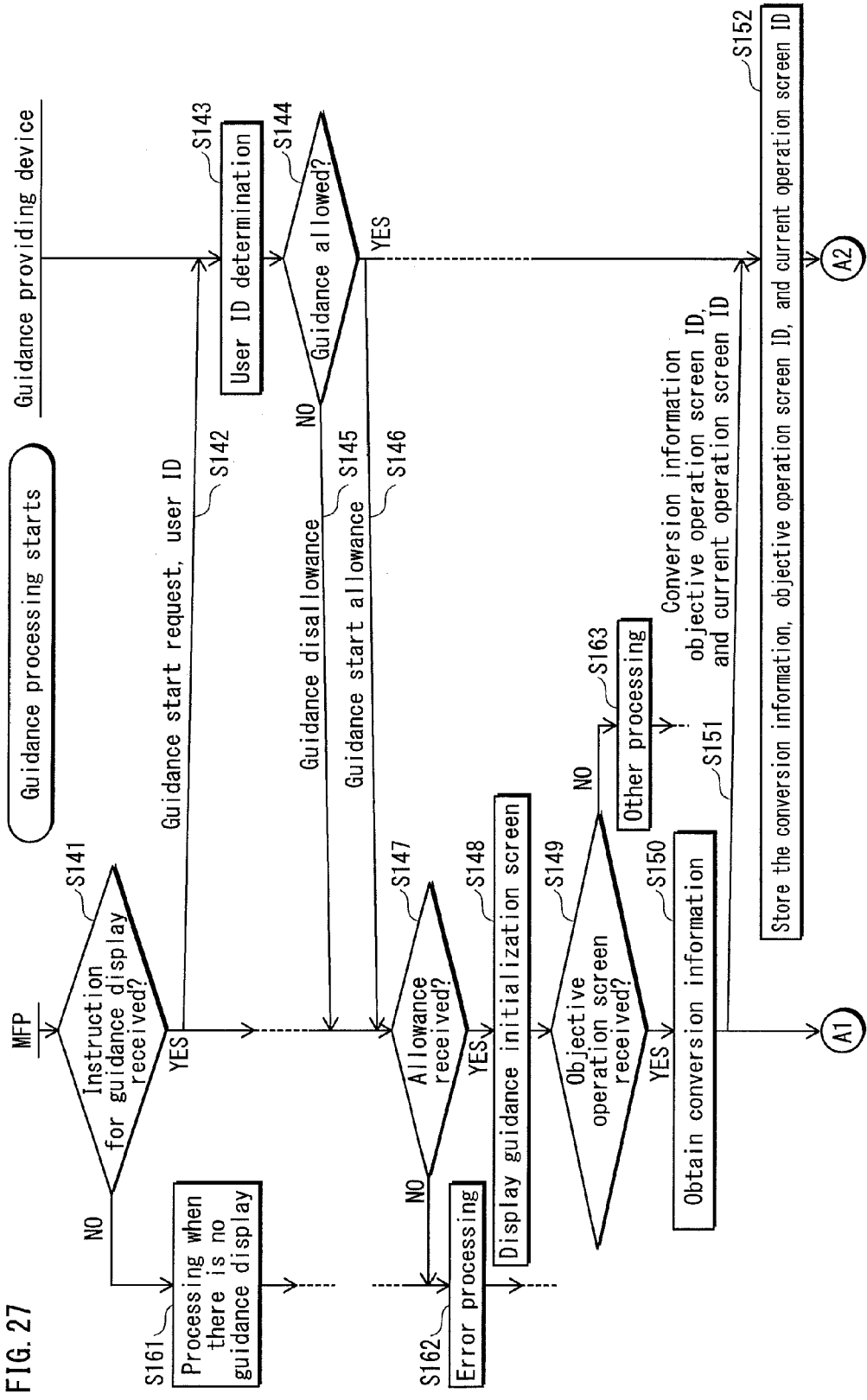
FIG. 27 is a flowchart showing the operations of the guidance providing device 100 and the MFP 200a in guidance processing (to be continued to FIG. 28)
Figure 28:
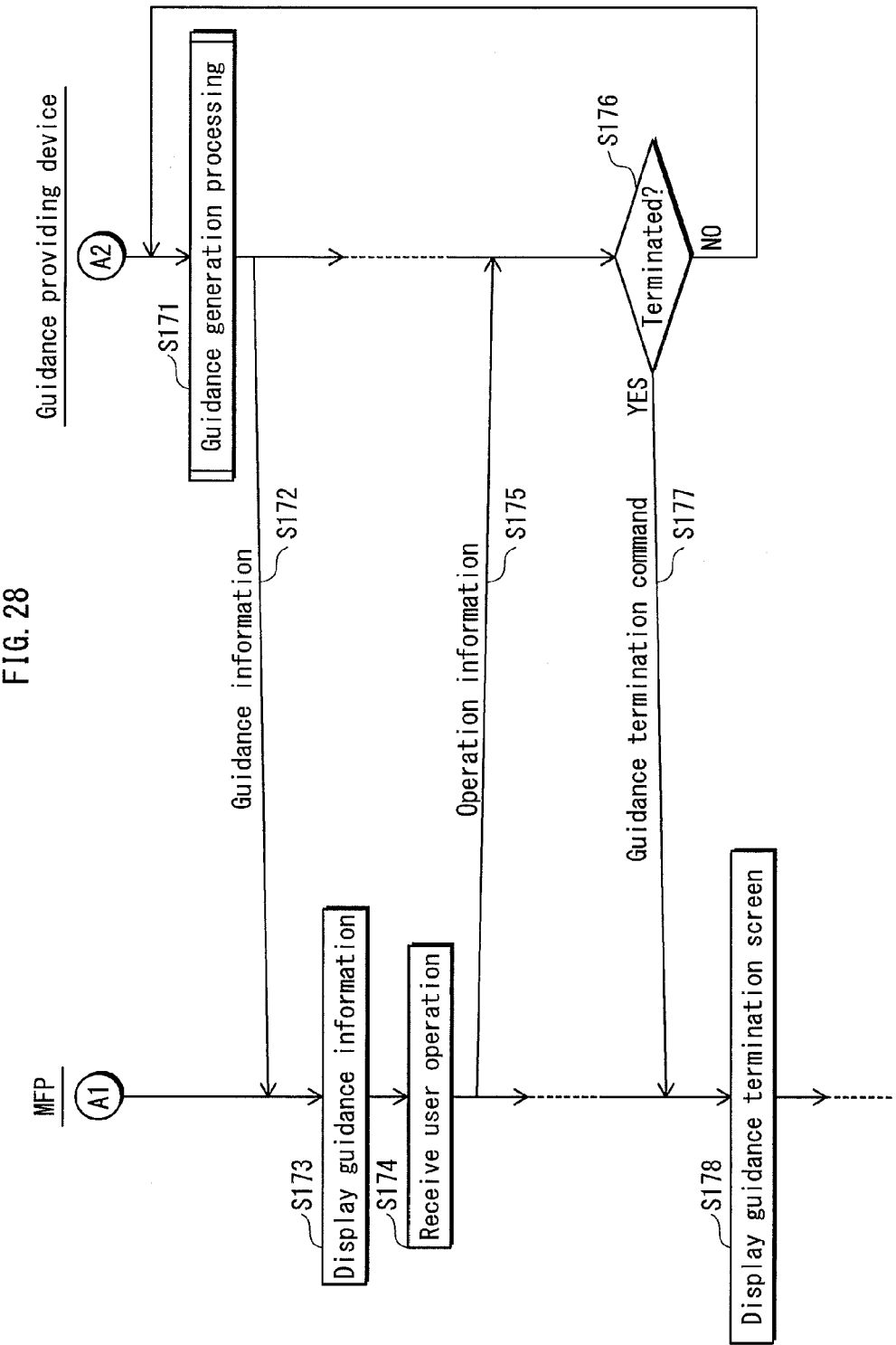
FIG. 28 is a flowchart showing the operations of the guidance providing device 100 and the MFP 200a in the guidance processing (continued from FIG. 27)

Next, a description is made of the operations of the guidance providing device 100 and the MFP 200a in guidance processing, with reference to the flowcharts of FIG. 27 and FIG. 28.

The input display controller 212 controls the display part 213 to display a message prompting the user to input an instruction as to whether the user requests guidance to be displayed, and receives the instruction from the user via the input part 214. If the received instruction indicates not to display guidance (Step S141), the input display controller 212 performs display processing without displaying guidance (Step S161).

If the received instruction indicates to display guidance (Step S141), the input display controller 212 transmits, to the guidance providing device 100, a guidance start request for requesting guidance to be started and the user ID received from the user (Step S142) via the communicator 211 and the global network 20.

From the MFP 200a, the controller 104 receives the guidance start request and the user ID via the global network 20 and the communicator 103 (Step S142). Upon receipt of the guidance start request and the user ID, the controller 104 determines whether the received user ID exists in the user ID table 350 stored in the information storage part 108 (Step S143). If it is determined that the user ID exists (YES in Step S144), the controller 104 transmits, to the MFP 200a, a guidance start allowance for permitting guidance to be started via the communicator 103 and the global network 20 (Step S146). If it is determined that the user ID does not exists (NO in Step S144), the controller 104 transmits a guidance disallowance for prohibiting guidance to be started to the MFP the MFP 200a via the communicator 103 and the global network 20 (Step S145).

The input display controller 212 receives the guidance disallowance or the guidance start allowance via the global network 20 and the communicator 211 from the guidance providing device 100, (Steps S145, S146). Upon receipt of the guidance disallowance (NO in Step S147), the input display controller 212 performs error processing (Step S162).

Upon receipt of the guidance start allowance (YES in Step S147), the input display controller 212 controls the display part 213 to display an initial guidance screen that guides the user to specify an objective operation screen that the user desires (Step S148). In the event that the MFP 200a does not receive the user's specification of objective operation screen ID via the input part 214 (NO is Step S149), the input display controller 212 performs other processing (Step S163). In the event that the MFP 200a receives, via the input part 21, function identification information identifying one of the functions of the MFP 200a that the user desires to execute, and the ID of the objective operation screen containing the desired function as specified by the received function identification information (YES in Step S149), the input display controller 212 performs the following processes: extracting the customized switching table ID corresponding the received user ID from the user table 231; reading the customized switching table identified by the extracted customized switching table ID and the standard switching table 232 from the information storage part 215; and generating conversion information containing the read customized switching table and the read standard switching table 232 (Step S150). Subsequently, the input display controller 212 obtains the ID of the current operation screen displayed on the display part 213, and transmits the conversion information, the objective operation screen ID, and the current operation screen ID to the guidance providing device 100 via the communicator 211 and the global network 20 (Step S151).

From the MFP 200a, the controller 104 receives the conversion information, the objective operation screen ID (i.e. objective identification information identifying the objective operation screen), and the current operation screen ID (Step S151). The controller 104 then writes the user ID, and the received conversion information, objective operation screen ID, and current operation screen ID into the conversion information table 360 of the information storage part 108 in such a manner that the user ID, conversion information, objective operation screen ID, and current operation screen ID are associated with each other (Step S152).

Subsequently, the guidance generator 105 and the route generator 106 perform guidance generation processing (Step S171). The guidance generator 105 then transmits the generated guidance information to the MFP 200a via the communicator 103 and the global network 20 (Step S172).

The input display controller 212 receives the guidance information via the global network 20 and the communicator 211 from the guidance providing device 100, (Step S172). The input display controller 212 then controls the display part 213 to display the received guidance information (Step S173). Upon receipt of operation information indicating the user operation via the input part 214 (Step S174), the input display controller 112 transmits the received operation information to the guidance providing device 100 via the communicator 211 and the global network 20.

The controller 104 receives the operation information from the MFP 200a via the global network 20 and the communicator 103 (Step S175), and determines whether the received operation information indicates termination of the guidance. If it is determined negatively (NO in Step S176), the processing returns to Step S171.

If it is determined positively (YES in Step S176), the controller 104 transmits, to the MFP 200a, a guidance termination command for bringing the guidance to an end via the communicator 103 and the global network 20 (Step S177).

The input display controller 212 receives the guidance termination command from the guidance providing device 100 via the global network 20 and the communicator 211 (Step S177), and controls the display part 213 to display a guidance termination screen indicating the termination of the guidance (Step S178).

The description has been made of the guidance processing of the guidance providing device 100 and the MFP 200a so far.

(4) Guidance Processing of MFP 200a

Figure 29:
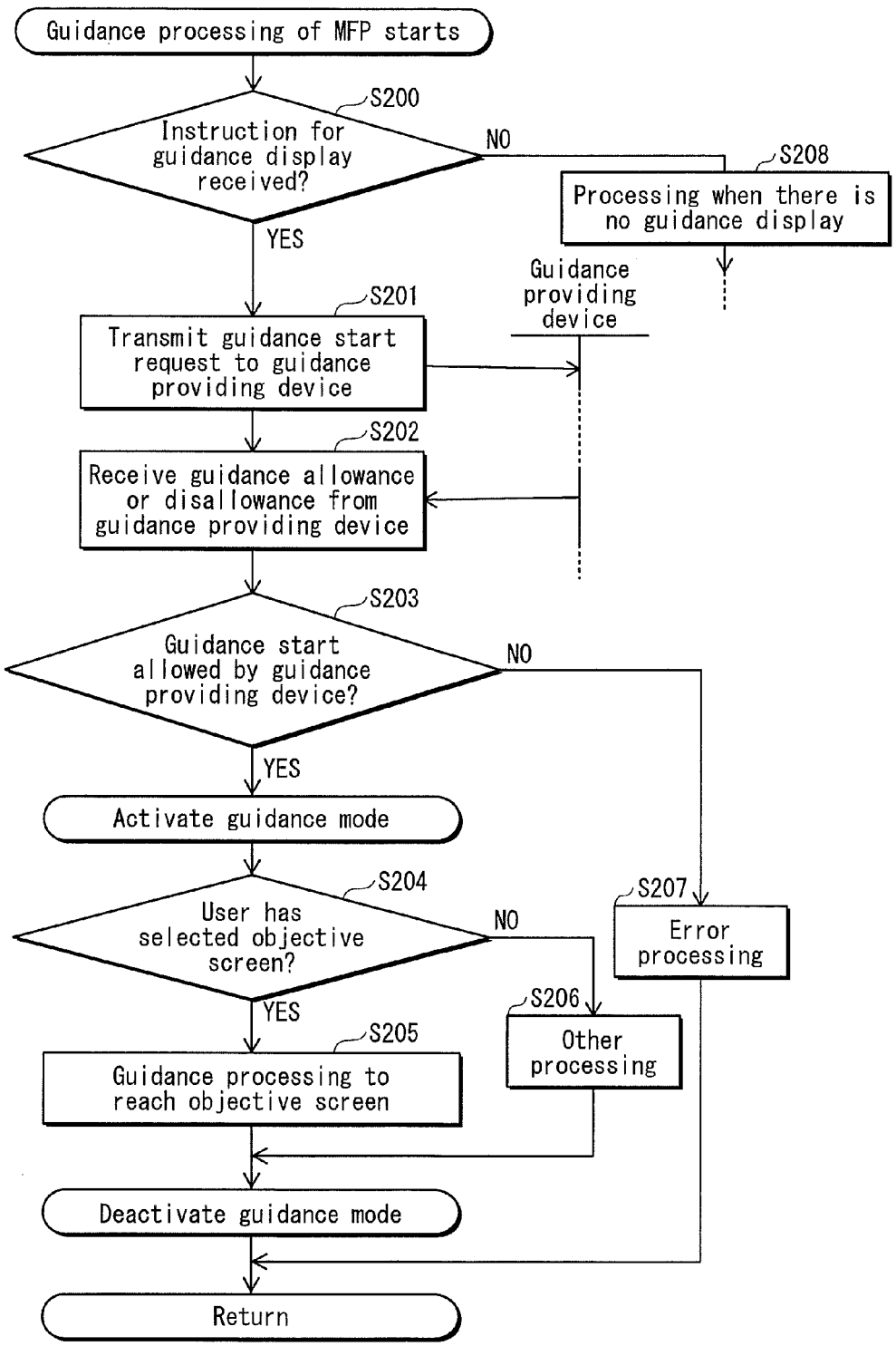
FIG. 29 is a flowchart showing the operations of the MFP 200a in the guidance processing.

Now, a description is given below of the guidance processing of the MFP 200a with reference to the flowchart of FIG. 29. Note that the description in "Guidance processing of MFP 200a" focuses on the steps performed by the MFP 200a in guidance processing, from among the steps shown in FIG. 27 and FIG. 28.

The input display controller 212 controls the display part 213 to display a message prompting the user to input an instruction as to whether the user requests guidance to be displayed. The input display controller 212 receives the instruction from the user via the input part 214. If the received instruction indicates not to display guidance (Step S200), the input display controller 212 performs the display processing without displaying guidance (Step S208).

If the received instruction indicates to display guidance (Step S200), the input display controller 212 transmits, to the guidance providing device 100, the guidance start request for requesting guidance to be started and the user ID received from the user (Step S201).

Subsequently, the input display controller 212 receives the guidance start allowance or the guidance disallowance from the guidance providing device 100 (Step S202).

If receiving the guidance disallowance (NO in Step S203), the input display controller 212 performs error processing (Step S207), and terminates the guidance processing.

If receiving the guidance start allowance (YES in Step S203), the input display controller 212 activates the guidance mode, and controls the display part 213 to display the initial guidance screen that guides the user to specify the objective operation screen. If not receiving the objective operation screen ID from the user via the input part 214 (NO in Step S204), the input display controller 212 performs other processing (Step S206), and deactivates the guidance mode to terminate the guidance processing.

If receiving the objective operation screen ID from the user via the input part 214 (YES in Step S204), the input display controller 212 performs the guidance processing for the user to reach the objective screen (Step S205), and deactivates the guidance mode to terminate the guidance processing.

(5) Guidance Processing of MFP 200a for Reaching Objective Screen

Figure 30:
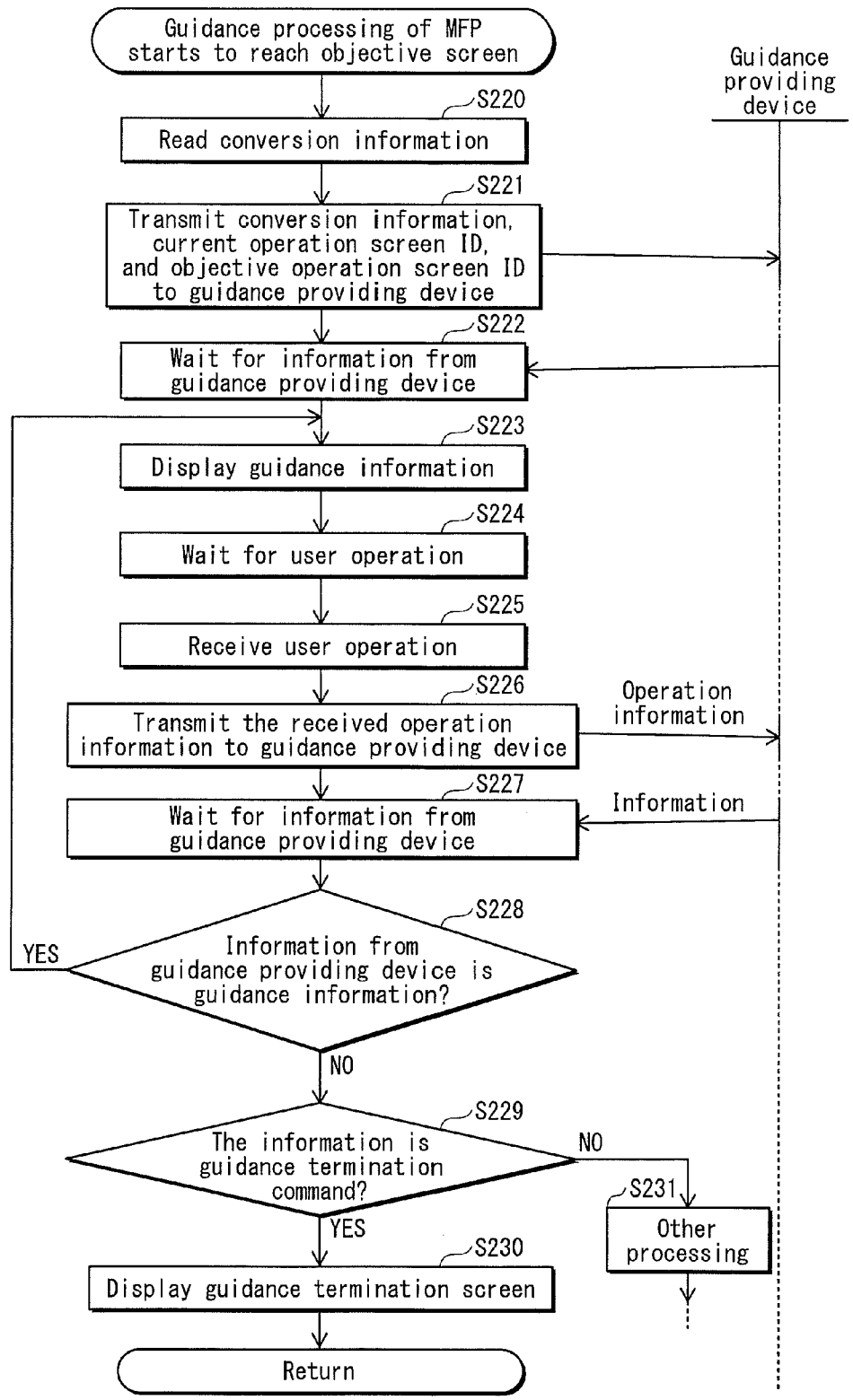
FIG. 30 is a flowchart showing the operations of the MFP 200a performed to reach the objective screen.

A description is made of the guidance processing of the MFP 200a for reaching the objective screen, with reference to the flowchart of FIG. 30. Note that in the description in "Guidance processing of MFP 200a for reaching objective screen" the Step S205 in FIG. 29 is looked at in further details.

The input display controller 212 obtains the conversion information (Step S220). Then, the input display controller 212 transmits the obtained conversion information, the current operation screen ID, and the objective operation screen ID to the guidance providing device 100 (Step S221). Subsequently, the input display controller 212 waits for information from the guidance providing device 100 (Step S222).

Upon receiving the guidance information from the guidance providing device 100, the input display controller 212 controls the display part 213 to display the received guidance information (Step S223).

Then, the input display controller 212 waits for a user operation via the input part 214 (Step S224). Upon receiving the operation information indicating the user operation (Step S225), the input display controller 212 transmits the received operation information to the guidance providing device 100 (Step S226).

Further, the input display controller 212 waits for information from the guidance providing device 100 (Step S227). Upon receipt of guidance information from the guidance providing device 100 (YES in Step S228), the processing returns to Step S223.

If the received information is not the guidance information (NO in Step S228) but the guidance termination command (YES in Step S229), the input display controller 212 controls the display part 213 to display the guidance termination screen (Step S230) to terminate the guidance for the user to reach the objective screen.

If the information received from the guidance providing device 100 is neither the guidance information (NO in Step S228) nor the guidance termination command (NO in Step S229), the input display controller 212 performs other processing.

(6) Guidance Generation Processing of Guidance Providing Device 100

Figure 31:
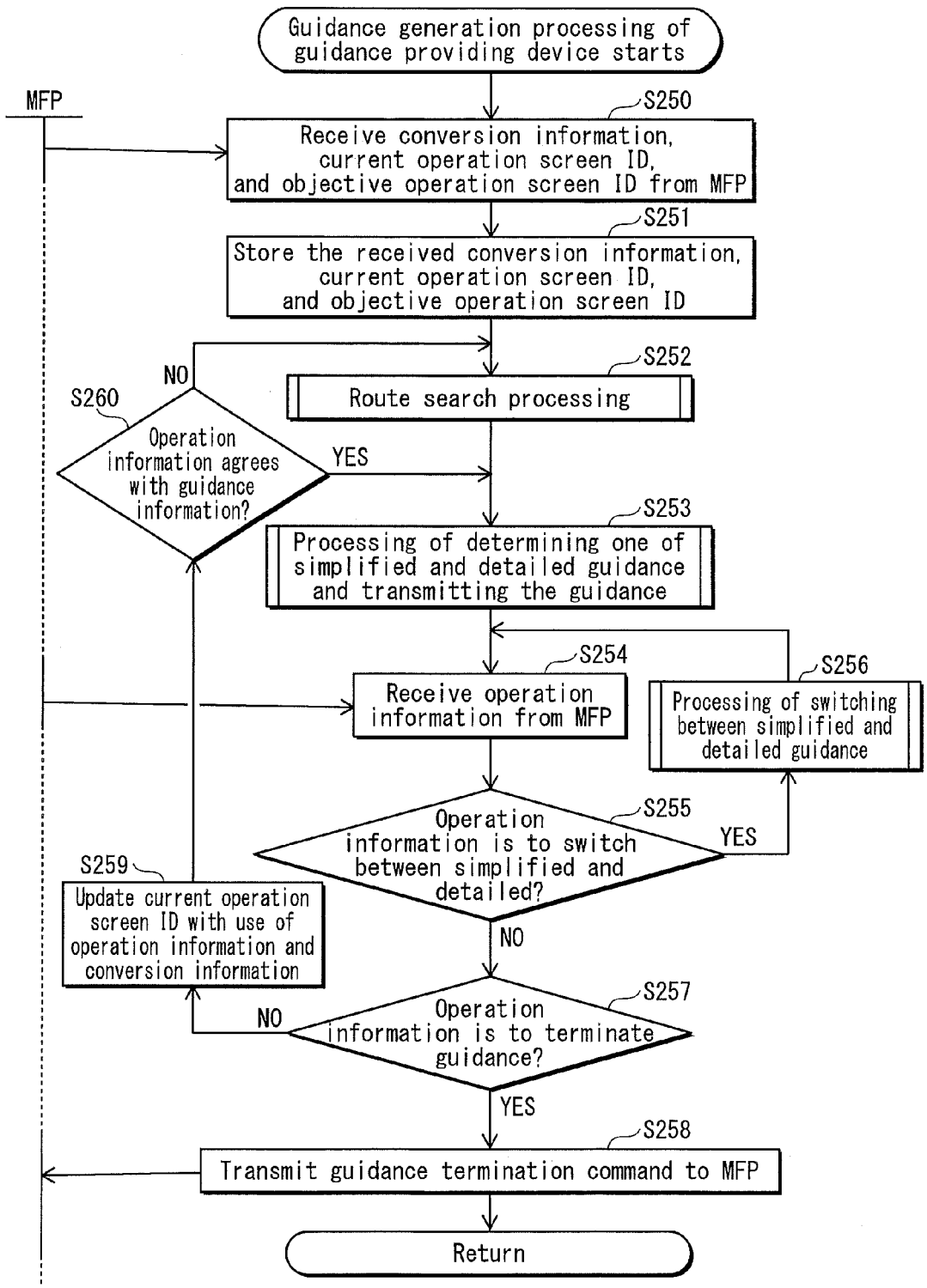
FIG. 31 is a flowchart showing the operations of the guidance providing device 100 in guidance generation processing.

A description is made below of the guidance generation processing of the guidance providing device 100 with reference to the flowchart of FIG. 31.

The controller 104 receives the conversion information, the objective operation screen ID, and the current operation screen ID from the MFP 200a via the global network 20 and the communicator 103 (Step S250). The controller 104 then writes the received conversion information, objective operation screen ID, and current operation screen ID into the conversion information table 360 of the information storage part 108 in such a manner that the conversion information, objective operation screen ID, and current operation screen ID are associated with each other (Step S251).

Subsequently, the route generator 106 performs a route search (Step S252) that will be described later, and the guidance processor 107 determines which of the simplified and detailed guidance is to be generated as will be described later, and transmits the generated guidance (Step S253).

Then, the controller 104 receives the operation information from the MFP 200a (Step S254), and determines whether the received operation information instructs switching to the simplified guidance, switching to the detailed guidance, or another operation (Step S255). If it is determined that the information instructs switching to the simplified guidance or switching to the detailed guidance (YES in Step S255), the guidance processor 107 performs switching processing between the simplified and detailed guidance (Step S256). More precisely, if the operation information received during display of simplified guidance indicates switching of the guidance, the guidance processor 107 generates the detailed guidance and transmits the generated detailed guidance to the MFP 200a, as shown in later-described FIG. 34. On the other hand, if the operation information during display of detailed guidance indicates the switching, the guidance processor 107 generates simplified guidance and transmits the generated simplified guidance to the MFP 200a, as shown in later-described FIG. 35. Then, the processing returns to Step S254. If it is determined that the information instructs another operation (NO in Step S255), the controller 104 makes another determination as to whether the operation information instructs the termination of the guidance (Step S257). If it is determined that the operation information instructs the termination of guidance (YES in Step S257), the controller 104 transmits the guidance termination command to the MFP 200a (Step S258) to terminate the guidance generation processing by the guidance providing device 100.

If it is determined that the operation information instructs an operation other than the termination of the guidance (NO in Step S257), the controller 104 updates the corresponding current operation screen ID in the conversion information table 360, using the operation information and the corresponding conversion information in the conversion information table 360 (Step S259). More specifically, the update processing is the following processes: extracting one of the rows for function information that contains the identical screen ID to the current operation screen ID, from the customized switching table corresponding to the user ID as stored in the conversion information table 360; extracting a command information piece corresponding to the operation display information indicated by the operation information, based on the extracted row for function information; and extracting the parameter from the extracted command information piece, the extracted parameter including a screen ID that identifies the operation screen to be displayed next; and overwriting the screen ID contained in the parameter as a new current operation screen ID in the conversion information table 360.

The controller 104 further determines whether the operation information agrees with the guidance information (Step S260). If it is determined positively (YES in Step S260), the controller 104 causes the processing to return to Step S253. In this case, it is determined that the user has completed an operation by following the guidance indicated according to the guidance information. Accordingly, the route search does not need to be performed again. If it is determined negatively (NO in Step S260), the controller 104 causes the processing to return to Step S252. In this case, it is determined that the user has not completed an operation by following the guidance indicated by the guidance information. Accordingly, the route search needs to be performed again.

(7) Route Search by Route Generator 106

A description is made of the operations of the route generator 106 in the route search.

The route generator 106 searches for one or more routes that lead from the current operation screen to the objective operation screen based on the customized switching table included in the conversion information and generates a route list indicating the searched routes. As mentioned above, the route list includes one or more route ranking information pieces. The route ranking information pieces correspond one-to-one with the searched routes (Step S281).

The route generator 106 determines whether one or more routes exist (Step S282). If the generated route list 300 contains no route ranking information pieces (NO in Step S282), this means that no route exists, and error processing is performed (Step S284).

If the generated route list 300 contains one or more route ranking information pieces (YES in Step S282), the route generator 106 selects the most appropriate route ranking information piece from among those contained in the route list 300. More specifically, the route generator 106 selects one route ranking information piece having the highest ranking from among those contained in the route list 300 (Step S283). An exemplary explanation is given with reference to the route list 300 of FIG. 3. Three route ranking information pieces included in the route list 300 of FIG. 3 each have the rankings of "1", "3", and "2". The route generator 106 selects the route ranking information piece having the highest ranking "1".

Then, the route generator 106 extracts the route ID from the selected route ranking information piece, and reads from the information storage part 108 the route information identified by the extracted route ID (Step S285).

(Examples of Route Search)

Figure 32:
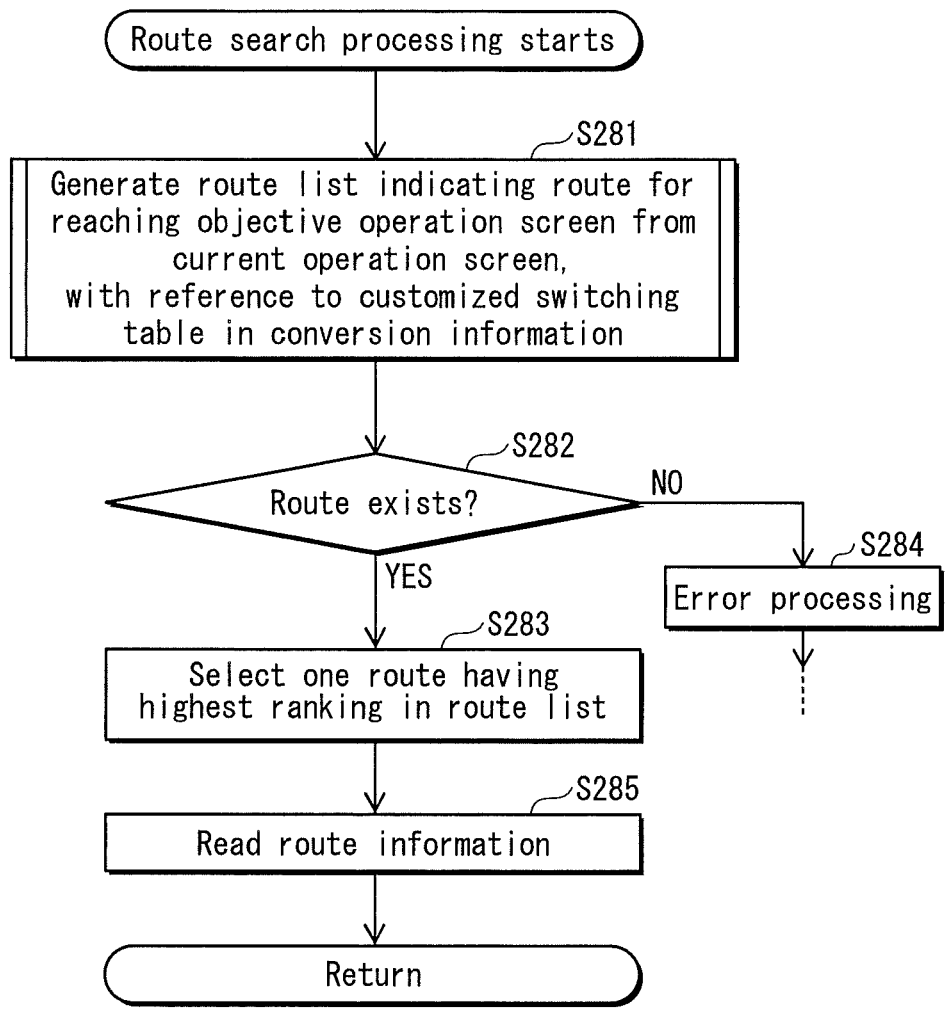
FIG. 32 is a flowchart showing the operations of a route generator 106 in a route search.

More precisely, the route search in Step S281 of FIG. 32 for searching one or more routes leading from the current operation screen to the objective operation screen is performed as follows. Here, a description is made below with reference to the customized switching table 233 of FIG. 24.

(Step 1) The route generator 106 writes the objective operation screen ID into the route information.

(Step 2) The route generator 106 stores the objective operation screen ID as a starting screen ID.

(Step 3) The route generator 106 searches the customized switching table 233 for a command information piece containing the parameter indicating the identical screen ID to the starting screen ID. After such a command information piece is found, the route generator 106 extracts, from the customized switching table 233, a row for functional information containing the searched command information piece, and the screen ID contained in the extracted row for functional information. Then, the route generator 106 writes the extracted screen ID in a place subsequent to the latest starting screen ID in the route information. Further, the route generator 106 stores the extracted screen ID as a new starting screen ID.

(Step 4) The route generator 106 determines whether the extracted screen ID is the current operation screen ID.

(Step 4-1) If it is determined positively, the route generator 106 reverses the order of the screen IDs in the route information. In other words, the screen IDs arranged in the route information in order from the ending to starting points of the route are rearranged in the opposite order. Then, the route search processing is brought to an end.

(Step 4-2) On the other hand, if judged in the negative, the processing returns to Step 3 to repeat the subsequent steps.

Thus, in the above-described manner, the route search is performed for each route and the corresponding route information is generated.

Meanwhile, if two or more command information pieces in the customized switching table 233 contain the parameters indicating the identical screen ID to the starting screen ID, two or more routes may be generated so that the generated routes diverge from the screen ID.

A description is made below in further details with reference to the customized switching table 233 of FIG. 24.

Note that the description here is made on a case in which the objective operation screen is the operation screen F'.

The route generator 106 writes the ID of the operation screen F'.

Subsequently, the route generator 106 searches for an operation screen from which the operation screen F' is reached. The customized switching table 233 of FIG. 24 indicates the followings regarding the operation screen E'. With an operation on the operation display image "next", the operation screen E' may be switched to the operation screen F'. Referring to the customized switching table 233, the route generator 106 extracts the ID of the operation screen E', and writes the extracted ID of the operation screen E' into the route information.

Further, the route generator 106 performs a similar route search, with the operation screen E' as the objective operation screen. The customized switching table 233 of FIG. 24 indicates the followings regarding the operation screen D'. With an operation on the operation display image "next", the operation screen D' may be switched to the operation screen E'. Referring to the customized switching table 233, the route generator 106 extracts the ID of the operation screen D', and writes the extracted ID of the operation screen D' in the route information.

Again, the route generator 106 performs a similar route search, with the operation screen D' as the objective operation screen. The customized switching table 233 of FIG. 24 indicates the following regarding the operation screen A'. With an operation on the operation display image "scan to box", the operation screen A' is switched to the operation screen D'. Referring to the customized switching table 233, the route generator 106 extracts the ID of the operation screen A', and writes the extracted ID of the operation screen A' in the route information.

Subsequently, the route generator 106 reorders the screen IDs that have been written in the route information.

In the above-described manner, the route generator 106 generates the route information in which the IDs of the operation screen the operation screen D', the operation screen E', the operation screen F' are arranged in the stated order.

(8) Determination and Transmission Processing of Simplified and Detailed Guidance by Guidance Processor 107

Figure 33:
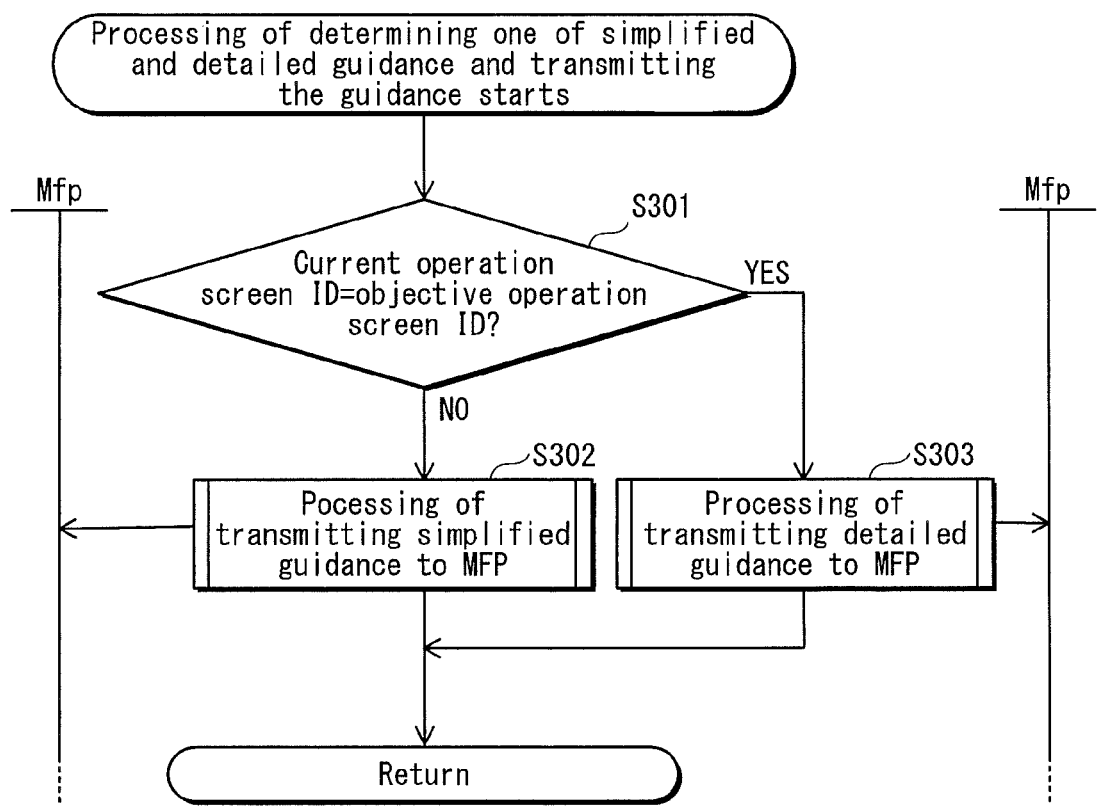
FIG. 33 is a flowchart showing the operations of a guidance processor 107 to determine as to which of simplified and detailed guidance is to be generated and to transmit the generated guidance.

A description is given below of the operations of the guidance processor 107 in the determination and transmission processing of the simplified and detailed guidance, with reference to the flowchart of FIG. 33.

The guidance processor 107 determines whether the current operation screen ID is identical to the objective operation screen ID (Step S301). If it is determined positively (YES in Step S301), the guidance processor 107 transmits the detailed guidance to the MFP 200a (Step S303). If it is determined negatively (NO in Step S301), the guidance processor 107 transmits the simplified guidance to the MFP 200a (Step S302).

Figure 34:
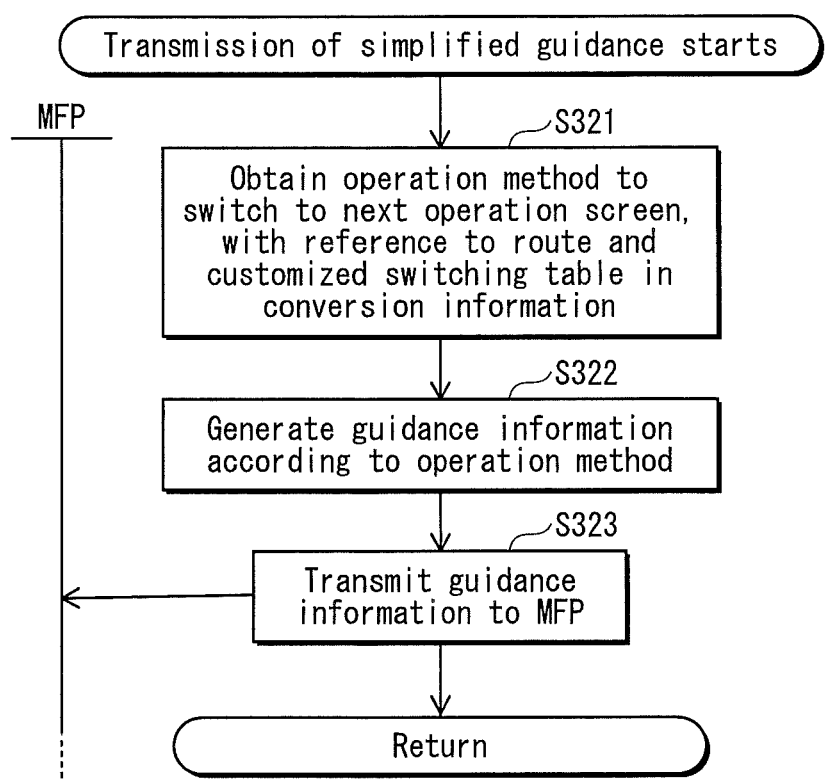

Firstly, a description is given of the operations of the guidance processor 107 in the transmission processing of the simplified guidance to the MFP 200a, with reference to the flowchart of FIG. 34.

Based on the corresponding customized switching table in the conversion information and the route information, the guidance processor 107 obtains an operation method for switching to the next operation screen (Step S321). Then, the guidance processor 107 generates the guidance information including the obtained operation method (Step S322), and transmits the generated guidance information to the MFP 200a (Step S323).

Figure 35:
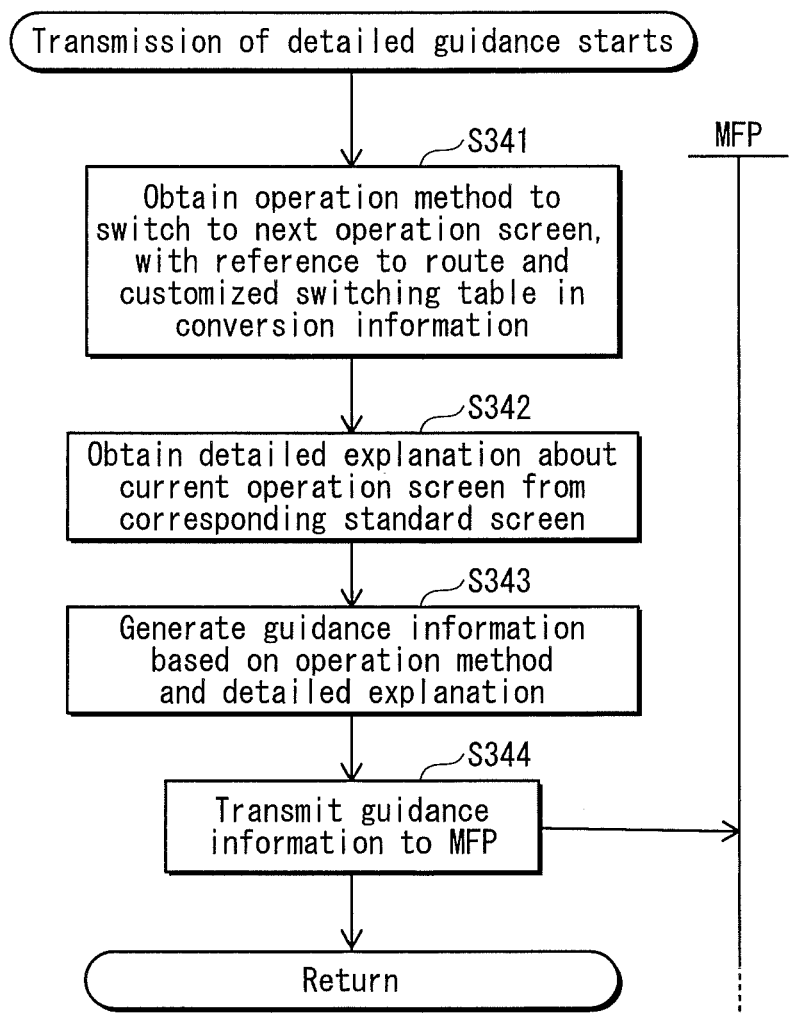

Secondly, a description is given of the operations of the guidance processor 107 in the transmission processing of the detailed guidance to the MFP 200a, with reference to the flowchart of FIG. 35.

Based on the corresponding customized switching table in the conversion information and the route information, the guidance processor 107 obtains an operation method for switching to the next operation screen (Step S341). Then, the guidance processor 107 obtains a detailed explanation about the current operation screen from standard screen information. The standard screen information becomes a basis for generating a standard screen corresponding to the current operation screen (Step S342). The standard screen information includes a detailed explanation to be displayed on each customized screen. Then, the guidance processor 107 generates the guidance information including the obtained operation method and the obtained detailed explanation (Step S343), and transmits the generated guidance information to the MFP 200a (Step S344).

(9) Screen Display Processing of MFP 200a

Figure 36:
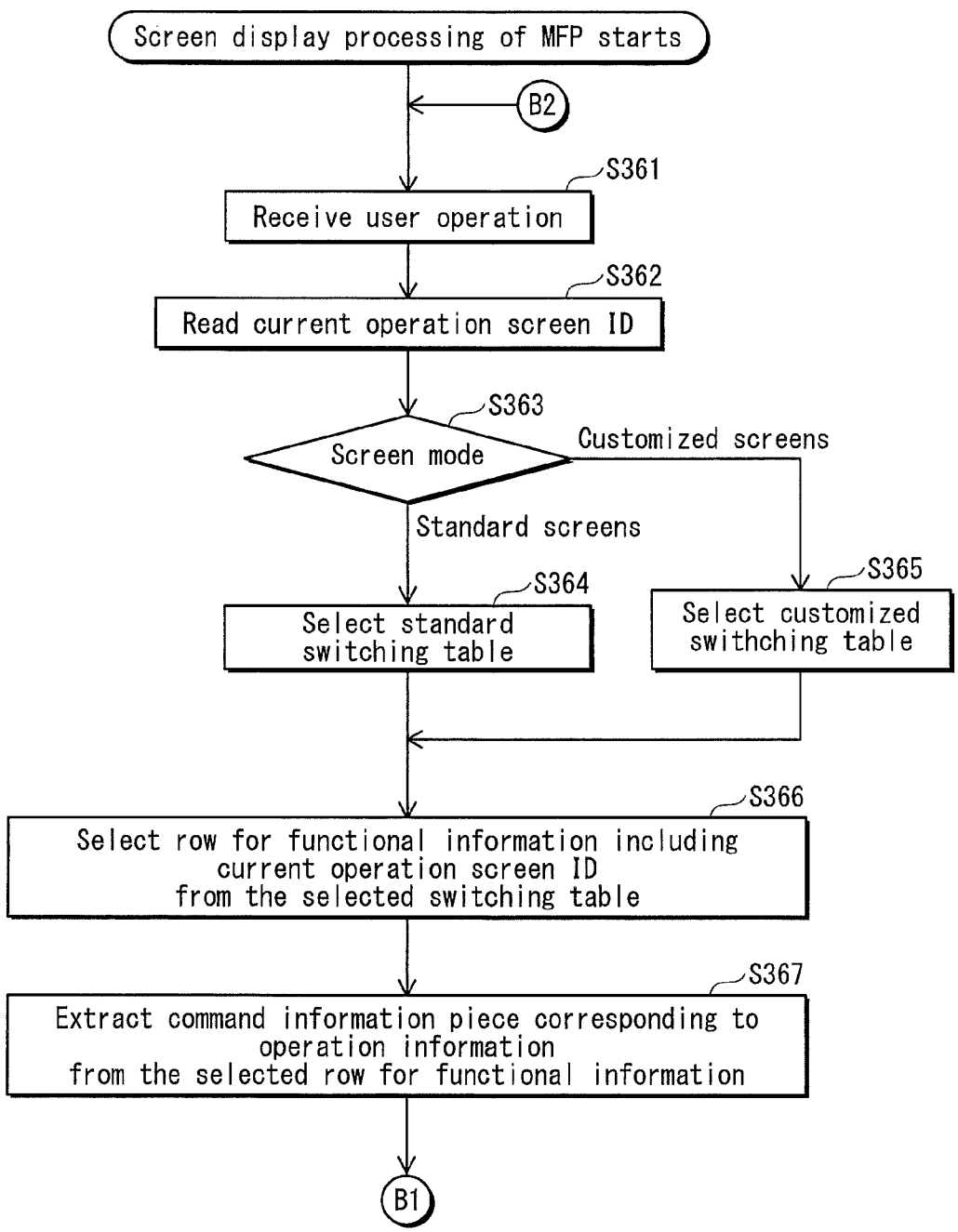
FIG. 36 is a flowchart showing the operations of the MFP 200a in screen display processing (to be continued to FIG. 37)
Figure 37:
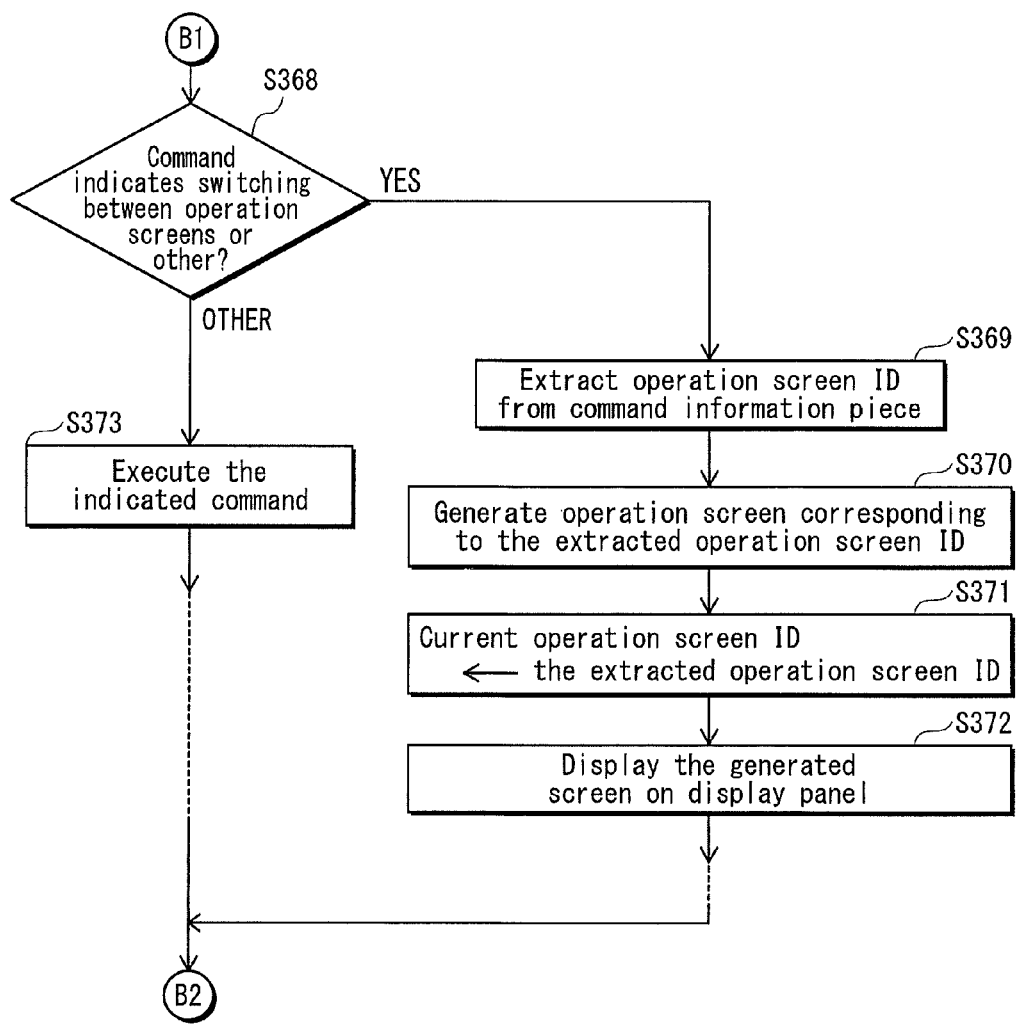
FIG. 37 is a flowchart showing the operations of the MFP 200a in the screen display processing (continued from FIG. 36).

Now, a description is given of the screen display processing of the MFP 200a with reference to the flowcharts of FIG. 36 and FIG. 37.

The input part 214 receives an input operation from the user of the MFP 200a, and outputs the received input operation to the input display controller 212 as operation information (Step S361).

Then, the input display controller 212 reads the current operation screen ID from the information storage part 215 (Step S362). The input display controller 212 also determines whether the screen mode 236 indicates "customized screens" or "standard screens" (Step S363). If it is determined that the screen mode 236 indicates "customized screens", the input display controller 212 selects the customized switching table (Step S365), and if it is determined that the screen mode 236 indicates "standard screens", the input display controller 212 selects the standard switching table (Step S364).

From the selected switching table, the input display controller 212 selects a row for functional information including the current operation screen ID (Step S366). Based on the selected row for functional information, the input display controller 212 extracts a command information piece corresponding to the operation information received from the input part 214 (Step S367). The input display controller 212 then determines the parameter included in the extracted command information piece (Step S368). If it is determined that the command indicates "switch screen" (Step S368), the input display controller 212 performs the following steps. The steps are extracting the screen ID from the command information piece (Step S369), generating the operation screen corresponding to the extracted screen ID (Step S370), storing the extracted screen ID as the current operation screen ID (Step S371), and controlling the display part 213 to display the generated operation screen (Step S372). Once the steps are performed, the processing returns to Step S361.

If it is determined that the command is a command other than "switch screen" (Step S368), the input display controller 212 executes the command as specified by the command information piece (Step S373). Then the processing returns to Step S361.

3. Modifications

The present invention has been described based on, but is by no means limited to, the above-described embodiment. Cases such as the following are included in the scope of the present invention.

(1) The guidance providing system 10 of the above embodiment includes the guidance providing device 100, the MFP 200a, the MFP 200b, and the MFP 200c. However, the present invention is not limited to the embodiment.

The guidance providing system (not shown) may further include a server device (not shown). In other words, the guidance providing system may be composed of the guidance providing device 100, the server device, the MFP 200a, the MFP 200b, and the MFP 200c. The server device is connected to the MFP 200a, the MFP 200b, and the MFP 200c via a local network, and connected to the guidance providing device 100 via the global network 20.

The guidance providing device 100 outputs the guidance information or the like with respect to the operations of the MFPs to each of the MFP 200a, the MFP 200b, and the MFP 200c. Each of the MFP 200a, the MFP 200b, and the MFP 200c displays the transmitted guidance information or the like on the display panel. The operator of each of the MFP 200a, the MFP 200b, and the MFP 200c performs an operation in accordance with the displayed guidance information or the like.

The server device is a computer system mainly composed of a microprocessor, a ROM, a RAM, a hard disk unit, a communication unit. A computer program is stored in the RAM or the hard disk unit. The server device achieves its functions by the microprocessor operating in accordance with the computer program. The server device is a relay device that relays the guidance providing device 100 with the MFP 200a. The server also relays the guidance providing device 100 with the MFP 200b, and the guidance providing device 100 with the MFP 200c.

(2) The present invention may be methods shown by the above. Furthermore, the methods may be a computer program realized by a computer, and may be a digital signal of the computer program. Here, the computer program is a combination of instruction codes showing instructions to a computer for achieving predetermined functions.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on an electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

(3) The present invention may be any combination of the above-described embodiment and modifications.

4. Recapitulation

An aspect of the present invention recited in claim 1 provides a guidance information providing system comprising an image forming device and a guidance information providing device, wherein the image forming device (i) has a plurality of functions, (ii) sequentially displays a plurality of operation screens on a display panel by switching, and (iii) receives a user operation on each of the operation screens, the user operation being performed for one of the switching and execution of a function, and the operation screens including screens customized by a user of the image forming device, and the guidance information providing device includes:

a storage storing a plurality of switching information pieces in correspondence with the customized screens, each switching information piece indicating switching from a corresponding customized screen to another customized screen to be displayed in response to a user operation received on the corresponding screen;

a communicator operable to obtain a user specification of a desired customized screen on which a user operation is received for execution of a function desired by the user in the functions and output guidance information to the image forming device;

a route generator operable to generate route information with reference to the stored switching information pieces, the generated route information indicating a display order of customized screens to be sequentially displayed between a current customized screen on the display panel and the desired customized screen;

a controller operable to select, from among the stored switching information pieces, a switching information piece indicating switching from the current customized screen to a next customized screen to be displayed according to the display order indicated by the generated route information; and a guidance generator operable to generate the guidance information with use of the selected switching information piece, the guidance information indicating an operation method for the user to switch the current customized screen to the next customized screen.

The aspect of the present invention relates to switching from the current customized screen to the next customized screen to be displayed. According to the aspect, the route information indicating the display order from the current customized screen to the desired screen is generated with reference to the stored switching information pieces. A switching information piece indicating switching from the current customized screen to the next customized screen to be displayed is selected according to the display order indicated by the generated route information. The guidance information is generated with use of the selected switching information piece. The guidance information indicates an operation method for the user to switch the current customized screen to the next customized screen. The generated guidance information is output. The present aspect provides the following advantageous effect. The user of the image forming device is ensured to take a proper step to reach the desired customized screen simply by operating in accordance with the guidance information.

In the guidance information providing system according to an aspect recited in claim 2, each switching information piece includes an operation display information piece, each display information piece indicating an operation display image that (i) represents one of a function and the switching and (ii) is included in the corresponding customized screen designated as a switch source customized screen according to the corresponding switching information piece, switching of a customized screen to another customized screen occurs in response to a user operation on the operation display image included in the customized screen on the display panel, and the guidance generator generates the guidance information used for guiding the user to perform an operation on the operation display image indicated by the operation display information piece included in the selected switching information piece.

According to the aspect, appropriate guidance information is generated which enables the user to take a proper step to reach the desired customized screen.

In the guidance information providing system according to an aspect recited in claim 3, the route generator generates the route information based on the desired customized screen.

According to the aspect, it is ensured that the route information is generated based on the desired customized screen.

In the guidance information providing system of claim 4, the route generator generates the route information by tracking back from a switch destination customized screen to a switch source customized screen on a screen-to-screen basis, starting from the desired customized screen.

According to the aspect, it is ensured that the route information is generated with the desired customized screen as the starting point.

In the guidance information providing system according to an aspect recited in claim 5, each switching information piece includes switch source identification information and switch destination identification information, the switch source identification information identifying a switch source customized screen and the switch destination identification information identifying a switch destination screen, and the route generator obtains objective identification information identifying the desired customized screen, selects a switching information piece containing identical switch destination identification information to the objective identification information from among the stored switching information pieces, extracts switch source identification information from the selected switching information piece, and incorporates the extracted switch source identification information and the obtained objective identification information into the route information.

According to the aspect, it is ensured that a part of the route information is generated by specifying a switch source customized screen, with the objective customized screen as the starting point.

In the guidance information providing system according to an aspect recited in claim 6, the communicator further receives operation information indicating a user operation from the image forming device subsequent to the output of the guidance information, the controller further determines whether the received operation information agrees with the guidance information, and if it is determined that the received operation information agrees with the guidance information, the controller further obtains a switching information piece indicating switching from the next customized screen to a third customized screen to be displayed according to the display order indicated by the generated route information, the guidance generator further generates second guidance information indicating an operation method for the user to switch the next customized screen to the third customized screen, and the communicator further outputs the generated second guidance information.

The aspect of the present invention relates to switching from the next customized screen to the third customized screen to be displayed. The aspect provides the following advantageous effect. The user of the image forming device is ensured to take a proper step to reach the desired customized screen simply by operating in accordance with the second guidance information.

In the guidance information providing system according to an aspect recited in claim 7, the communicator further receives operation information indicating a user operation from the image forming device subsequent to the output of the guidance information, the controller further determines whether the received operation information agrees with the guidance information, and if it is determined that the received operation information agrees with the guidance information, the controller further obtains a switching information piece indicating switching from the next customized screen to a third customized screen to be displayed according to the display order indicated by the route information, the guidance generator further determines whether the third customized screen indicated by the obtained switching information piece is the desired customized screen, and if it is determined that the third customized screen is the desired customized screen, the guidance generator further generates second guidance information indicating an operation method for the user to operate the desired function, and the communicator further outputs the generated second guidance information.

The aspect relates switching from switching from the next customized screen to the third customized screen to be displayed, where the third customized screen is the desired customized screen. According to the aspect, the user is able to execute the desired function simply by operating in accordance with the second guidance information.

In the guidance information providing system according to an aspect recited in claim 8, the route generator generates the second guidance information indicating an operation method for the user to operate an operation display image that represents one of a function and the switching and is included in the third customized screen.

According to the aspect, the second guidance information indicates the operation method for the user to operate an operation button included in the third customized screen, namely the desired customized screen. Accordingly, the user is ensured to utilize the desired function in accordance with the guidance information.

In the guidance information providing system according to an aspect recited in claim 9, if it is determined that the third customized screen is not the desired customized screen, the guidance generator further generates third guidance information indicating an operation method for the user to switch to the third customized screen, and the communicator further outputs the generated third guidance information.

According to the aspect, the third guidance information indicates the user the operation method of the third customized screen that is not the desired customized screen. Accordingly, unwanted information is not displayed, thereby preventing the user from being disturbed.

In the guidance information providing system according to an aspect recited in claim 10, the communicator further receives the switching information pieces from the image forming device prior to the generation of the route information by the route generator, and the controller writes the switching information pieces received by the communicator to the storage.

According to the aspect, each customized screen is specially set, and for each customized screen, switching from a customized screen to another customized screen in response to a user operation received on the screen is specially set for convenience of a specific user. Accordingly, the guidance information is output with reference to the switching information pieces with respect to the customized screens customized by the specific user.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A guidance information providing system comprising an image forming device and a guidance information providing device, wherein
    the image forming device (i) has a plurality of functions, (ii) sequentially displays a plurality of operation screens on a display panel by switching, and (iii) receives a user operation on each of the operation screens, the user operation being performed for one of the switching and execution of a function, and the operation screens including screens customized by a user of the image forming device, and
    the guidance information providing device includes:
    a processor;
    a storage storing a plurality of switching information pieces in correspondence with the customized screens, each switching information piece indicating switching from a corresponding customized screen to another customized screen to be displayed in response to a user operation received on the corresponding screen;
    a communicator operable to obtain a user specification of a desired customized screen on which a user operation is received for execution of a function desired by the user in the functions and output guidance information to the image forming device;
    a route generator operable to generate route information with reference to the stored switching information pieces, the generated route information indicating a display order of customized screens to be sequentially displayed between a current customized screen on the display panel and the desired customized screen;
    a controller operable to select, from among the stored switching information pieces, a switching information piece indicating switching from the current customized screen to a next customized screen to be displayed according to the display order indicated by the generated route information; and
    a guidance generator operable to generate the guidance information with use of the selected switching information piece, the guidance information indicating an operation method for the user to switch the current customized screen to the next customized screen.

2. The guidance information providing system according to claim 1, wherein
    each switching information piece includes an operation display information piece, each display information piece indicating an operation display image that (i) represents one of a function and the switching and (ii) is included in the corresponding customized screen designated as a switch source customized screen according to the corresponding switching information piece,
    switching of a customized screen to another customized screen occurs in response to a user operation on the operation display image included in the customized screen on the display panel, and
    the guidance generator generates the guidance information used for guiding the user to perform an operation on the operation display image indicated by the operation display information piece included in the selected switching information piece.

3. The guidance information providing system according to claim 1, wherein
    the route generator generates the route information based on the desired customized screen.

4. The guidance information providing system according to claim 3, wherein
    the route generator generates the route information by tracking back from a switch destination customized screen to a switch source customized screen on a screen-to-screen basis, starting from the desired customized screen.

5. The guidance information providing system according to claim 4, wherein
    each switching information piece includes switch source identification information and switch destination identification information, the switch source identification information identifying a switch source customized screen and the switch destination identification information identifying a switch destination screen, and
    the route generator obtains objective identification information identifying the desired customized screen, selects a switching information piece containing identical switch destination identification information to the objective identification information from among the stored switching information pieces, extracts switch source identification information from the selected switching information piece, and incorporates the extracted switch source identification information and the obtained objective identification information into the route information.

6. The guidance information providing system according to claim 1, wherein
    the communicator further receives operation information indicating a user operation from the image forming device subsequent to the output of the guidance information,
    the controller further determines whether the received operation information agrees with the guidance information, and
    if it is determined that the received operation information agrees with the guidance information, the controller further obtains a switching information piece indicating switching from the next customized screen to a third customized screen to be displayed according to the display order indicated by the generated route information, the guidance generator further generates second guidance information indicating an operation method for the user to switch the next customized screen to the third customized screen, and the communicator further outputs the generated second guidance information.

7. The guidance information providing system according to claim 1 wherein the communicator further receives operation information indicating a user operation from the image forming device subsequent to the output of the guidance information, the controller further determines whether the received operation information agrees with the guidance information, and if it is determined that the received operation information agrees with the guidance information, the controller further obtains a switching information piece indicating switching from the next customized screen to a third customized screen to be displayed according to the display order indicated by the route information, the guidance generator further determines whether the third customized screen indicated by the obtained switching information piece is the desired customized screen, and if it is determined that the third customized screen is the desired customized screen, the guidance generator further generates second guidance information indicating an operation method for the user to operate the desired function, and the communicator further outputs the generated second guidance information.

8. The guidance information providing system according to claim 7, wherein the route generator generates the second guidance information indicating an operation method for the user to operate an operation display image that represents one of a function and the switching and is included in the third customized screen.

9. The guidance information providing system according to claim 7, wherein if it is determined that the third customized screen is not the desired customized screen, the guidance generator further generates third guidance information indicating an operation method for the user to switch to the third customized screen, and the communicator further outputs the generated third guidance information.

10. The guidance information providing system according to claim 1, wherein the communicator further receives the switching information pieces from the image forming device prior to the generation of the route information by the route generator, and the controller writes the switching information pieces received by the communicator to the storage.

11. The guidance information providing system according to claim 1, wherein the display order is based on a numerical ranking of the switching information pieces.

12. A guidance information providing device that provides guidance information indicating an operation method to an image forming device, the image forming device (i) having a plurality of functions, (ii) sequentially displaying a plurality of operation screens on a display panel by switching, and (iii) receiving a user operation on each of the operation screens, the user operation being performed for one of the switching and execution of a function, and the operation screens including screens customized by a user of the image forming device, comprising:

a processor;

a storage storing a plurality of switching information pieces in correspondence with the customized screens, each switching information piece indicating switching from a corresponding customized screen to another customized screen to be displayed in response to a user operation received on the corresponding screen;

a communicator operable to obtain a user specification of a desired customized screen on which a user operation is received for execution of a function desired by the user in the functions and output guidance information to the image forming device;

a route generator operable to generate route information with reference to the stored switching information pieces, the generated route information indicating a display order of customized screens to be sequentially displayed between a current customized screen on the display panel and the desired customized screen;

a controller operable to select, from among the stored switching information pieces, a switching information piece indicating switching from the current customized screen to a next customized screen to be displayed according to the display order indicated by the generated route information; and a guidance generator operable to generate the guidance information with use of the selected switching information piece, the guidance information indicating an operation method for the user to switch the current customized screen to the next customized screen.

13. The guidance information providing device according to claim 12, wherein the display order is based on a numerical ranking of the switching information pieces.

14. A computer readable non-transitory medium storing a computer program that is used in a computer for providing guidance information to an image forming device, the guidance information indicating an operation method, the image forming device (i) having a plurality of functions, (ii) sequentially displaying a plurality of operation screens on a display panel by switching, and (iii) receiving a user operation on each of the operation screens, the user operation being performed for one of the switching and execution of a function, and the operation screens including screens customized by a user of the image forming device, wherein the computer includes a storage storing a plurality of switching information pieces in correspondence with the customized screens, each switching information piece indicating switching from a corresponding customized screen to another customized screen to be displayed in response to a user operation received on the corresponding screen, and the stored computer program causes the computer to perform:

an obtaining step of obtaining a user specification of a desired customized screen on which a user operation is received for execution of a function desired by the user in the functions;

a generating step of generating route information with reference to the stored switching information pieces, the generated route information indicating a display order of customized screens to be sequentially displayed between a current customized screen on the display panel and the desired customized screen on which a user operation is received for execution of the desired function;

a controlling step of selecting, from among the stored switching information pieces, a switching information piece indicating switching from the current customized screen to a next customized screen to be displayed according to the display order indicated by the generated route information;

a guidance generating step of generating guidance information with use of the selected switching information piece, the guidance information indicating an operation method for the user to switch the current customized screen to the next customized screen; and an outputting step of outputting the generated guidance information to the image forming device.

15. The computer readable storage medium according to claim 14, wherein the display order is based on a numerical ranking of the switching information pieces.

* * * * *